United States Patent
Kumamoto et al.

(10) Patent No.: US 10,642,097 B2
(45) Date of Patent: May 5, 2020

(54) IMAGE DISPLAY DEVICE INCLUDING MULTIPLE LIGHT SOURCE SUBSTRATES

(71) Applicant: Panasonic Intellectual Property Management Co., Ltd., Osaka (JP)

(72) Inventors: Yasuhiro Kumamoto, Osaka (JP); Takeichi Shinya, Osaka (JP); Koujirou Higa, Osaka (JP); Masaaki Ofuji, Osaka (JP); Taizou Takeuchi, Osaka (JP); Tadahiro Kugimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/750,886

(22) PCT Filed: Aug. 30, 2016

(86) PCT No.: PCT/JP2016/003942
§ 371 (c)(1),
(2) Date: Feb. 7, 2018

(87) PCT Pub. No.: WO2017/038083
PCT Pub. Date: Mar. 9, 2017

(65) Prior Publication Data
US 2018/0231838 A1   Aug. 16, 2018

(30) Foreign Application Priority Data

Sep. 1, 2015 (JP) .................................. 2015-172363
Mar. 10, 2016 (JP) .................................. 2016-046749

(51) Int. Cl.
*G09G 3/36* (2006.01)
*G02F 1/13357* (2006.01)
(Continued)

(52) U.S. Cl.
CPC .......... *G02F 1/133603* (2013.01); *F21S 2/00* (2013.01); *F21V 19/001* (2013.01);
(Continued)

(58) Field of Classification Search
CPC ...... G02F 1/133603; G02F 1/133; G09G 3/36
See application file for complete search history.

(56) References Cited

U.S. PATENT DOCUMENTS 6,362,801 B1   3/2002  Yuhara
2003/0072153 A1   4/2003  Matsui et al.
(Continued)

FOREIGN PATENT DOCUMENTS

EP   2090924 A2   8/2009
EP   2184634 A2   5/2010
(Continued)

OTHER PUBLICATIONS

Non-Final Office Action issued in U.S. Appl. No. 15/750,881, dated Oct. 4, 2018.
(Continued)

*Primary Examiner* — Lisa S Landis
(74) *Attorney, Agent, or Firm* — McDermott Will & Emery LLP

(57) ABSTRACT

A video display device includes a liquid crystal display panel, and a plurality of light source substrates configured to illuminate the liquid crystal display panel from a rear side of the liquid crystal display panel. Each of the plurality of light source substrates includes a signal input connector that receives a control signal, a plurality of light emitting diodes each of which is provided in correspondence with a corresponding one of areas different from each other in the liquid crystal display panel, a driver element that drives each of the plurality of light emitting diodes in accordance with the control signal such that each of the plurality of light emitting
(Continued)

diodes emits light with luminance corresponding to brightness of the corresponding area of an image, and a signal output connector that through-outputs the control signal. The signal output connector of a first light source substrate included in the plurality of light source substrates, and the signal input connector of a second light source substrate included in the plurality of light source substrates are electrically connected.

10 Claims, 12 Drawing Sheets

(51) Int. Cl.
  F21S 2/00 (2016.01)
  G02F 1/133 (2006.01)
  F21V 19/00 (2006.01)
  F21V 23/00 (2015.01)
(52) U.S. Cl.
  CPC ............ *F21V 23/001* (2013.01); *G02F 1/133* (2013.01); *G09G 3/36* (2013.01)

(56) References Cited

U.S. PATENT DOCUMENTS

| | | | |
|---|---|---|---|
| 2004/0125269 A1 | 7/2004 | Kim et al. | |
| 2004/0239829 A1 | 12/2004 | Yu et al. | |
| 2005/0265051 A1 | 12/2005 | Yamamoto et al. | |
| 2006/0092346 A1 | 5/2006 | Moon et al. | |
| 2007/0242477 A1 | 10/2007 | Yoo et al. | |
| 2008/0143916 A1 | 6/2008 | Fujino et al. | |
| 2009/0003002 A1 | 1/2009 | Sato | |
| 2009/0021932 A1 | 1/2009 | Kim et al. | |
| 2009/0121652 A1 | 5/2009 | Kang et al. | |
| 2009/0135331 A1 | 5/2009 | Kawase | |
| 2009/0167194 A1 | 7/2009 | Mizuta | |
| 2009/0201441 A1 | 8/2009 | Laney et al. | |
| 2009/0302780 A1 | 12/2009 | Kim et al. | |
| 2009/0309498 A1* | 12/2009 | Park ................... | G02F 1/133603 315/32 |
| 2009/0310335 A1 | 12/2009 | Park | |
| 2010/0066752 A1 | 3/2010 | Watanuki | |
| 2010/0109562 A1 | 5/2010 | Shen et al. | |
| 2010/0156955 A1 | 6/2010 | Kimura | |
| 2011/0050111 A1 | 3/2011 | Tanaka et al. | |
| 2011/0063850 A1 | 3/2011 | Oide et al. | |
| 2011/0304798 A1 | 12/2011 | Tanaka et al. | |
| 2011/0310590 A1 | 12/2011 | Yamashita et al. | |
| 2012/0019490 A1 | 1/2012 | Huang | |
| 2012/0087122 A1 | 4/2012 | Takeuchi et al. | |
| 2012/0139445 A1 | 6/2012 | Fujiwara et al. | |
| 2012/0212682 A1 | 8/2012 | Kuromizu | |
| 2012/0218752 A1 | 8/2012 | Sumitani | |
| 2012/0293724 A1* | 11/2012 | Ueyama ............... | G02B 6/0083 348/739 |
| 2013/0069560 A1* | 3/2013 | Kurita .................... | H05B 37/02 315/294 |
| 2013/0094187 A1 | 4/2013 | Kamada | |
| 2013/0229596 A1 | 9/2013 | Hosoki | |
| 2014/0211123 A1 | 7/2014 | Lee et al. | |
| 2018/0231838 A1 | 8/2018 | Kumamoto et al. | |

FOREIGN PATENT DOCUMENTS

| | | |
|---|---|---|
| EP | 2492742 A1 | 8/2012 |
| EP | 3318792 A1 | 5/2018 |
| EP | 3318793 A1 | 5/2018 |
| JP | 2001-338505 A | 12/2001 |
| JP | 2005-109228 A | 4/2005 |
| JP | 2006-128125 A | 5/2006 |
| JP | 2007-322697 A | 12/2007 |
| JP | 2008-166304 A | 7/2008 |
| JP | 2008-270144 A | 11/2008 |
| JP | 2009-032593 A | 2/2009 |
| JP | 2009-140720 A | 6/2009 |
| JP | 2009-162952 | 7/2009 |
| JP | 2009-222793 | 10/2009 |
| JP | 2011-034949 A | 2/2011 |
| JP | 2011-090949 A | 5/2011 |
| JP | 2012-004067 A | 1/2012 |
| JP | 2012-089509 A | 5/2012 |
| JP | 2012-119436 A | 6/2012 |
| JP | 2012-174634 A | 9/2012 |
| JP | 2012-204337 A | 10/2012 |
| JP | 2012-212509 A | 11/2012 |
| JP | 2013-182076 A | 9/2013 |
| JP | 2013-246988 A | 12/2013 |
| JP | 2014-041830 | 3/2014 |
| JP | 2014-041830 A | 3/2014 |
| JP | 2014-067679 A | 4/2014 |
| JP | 2014-149529 A | 8/2014 |
| WO | 2008/156020 A1 | 12/2008 |
| WO | 2010/101062 | 9/2010 |
| WO | 2011/058903 | 5/2011 |

OTHER PUBLICATIONS

International Search Report of PCT application No. PCT/JP2016/003943 dated Nov. 8, 2016.
International Search Report of PCT application No. PCT/JP2016/003939 dated Nov. 22, 2016.
International Search Report of PCT application No. PCT/JP2016/003941 dated Nov. 8, 2016.
International Search Report of PCT application No. PCT/JP2016/003940 dated Nov. 8, 2016.
International Search Report of PCT application No. PCT/JP2016/003945 dated Nov. 22, 2016.
The Extended European Search Report dated Sep. 24, 2018 for the related European Patent Application No. 16841119.7.
International Search Report of PCT application No. PCT/JP2016/003942 dated Nov. 22, 2016.
The Extended European Search Report dated Jun. 19, 2018 for the related European Patent Application No. 16841114.8.
The Extended European Search Report dated Jun. 26, 2018 for the related European Patent Application No. 16841115.5.
The Extended European Search Report dated Jun. 22, 2018 for the related European Patent Application No. 16841116.3.
The Extended European Search Report dated Jun. 28, 2018 for the related European Patent Application No. 16841117.1.
The Extended European Search Report dated Jun. 14, 2018 for the related European Patent Application No. 16841118.9.
The Partial Supplementary European Search Report dated Jun. 27, 2018 for the related European Patent Application No. 16841119.7.
Non-Final Office Action issued in U.S. Appl. No. 15/750,883, dated Jan. 9, 2019.
Non-Final Office Action issued in U.S. Appl. No. 15/750,874, dated Dec. 13, 2018.
Non-Final Office Action issued in U.S. Appl. No. 15/750,871, dated Jan. 2, 2019.
Final Office Action issued in U.S. Appl. No. 15/750,881, dated Apr. 30, 2019.
Non-Final Office Action issued in U.S. Appl. No. 15/750,871, dated Jun. 13, 2019.
Non-Final Office Action issued in U.S. Appl. No. 15/754,208, dated Aug. 8, 2019.
Notice of Allowance issued in U.S. Appl. No. 15/750,883, dated Sep. 3, 2019.
Final Office Action issued in U.S. Appl. No. 15/750,883, dated Jul. 1, 2019.
The EPC Office Action dated Jan. 13, 2020 for the related European Patent Application No. 16841115.5.

* cited by examiner

IMAGE DISPLAY DEVICE INCLUDING MULTIPLE LIGHT SOURCE SUBSTRATES

This application is a U.S. national stage application of the PCT International Application No. PCT/JP2016/003942 filed on Aug. 30, 2016, which claims the benefit of foreign priority of Japanese patent applications No. 2015-172363 filed on Sep. 1, 2015 and No. 2016-046749 filed on Mar. 10, 2016, the contents all of which are incorporated herein by reference.

TECHNICAL FIELD

The present disclosure relates to a video display device including a backlight.

BACKGROUND ART

For example, various technologies for improving quality of images formed by a video display device including a backlight, such as a liquid crystal display device, have been developed. A technology called local dimming is one of examples of these technologies.

Patent Literature 1 discloses a technology relating to local dimming. Local dimming is a technology which divides a liquid crystal display panel into a plurality of areas, and dims each of light sources disposed in corresponding one of the areas in accordance with brightness of an image formed in the corresponding area of the liquid crystal display panel. This technology can increase contrast of images within one screen. Each of the light sources is constituted by a light emitting diode (LED), for example.

CITATION LIST

Patent Literature

PTL 1: Unexamined Japanese Patent Publication No. 2014-41830

SUMMARY

According to the video display device performing local dimming, it is effective to provide a larger number of LEDs capable of independently dimming and achieving partial finer control of a backlight based on an image for accurate contrast increase within a screen.

However, the video display device which independently dims numerous LEDs requires numerous substrates and cables corresponding to the numerous LEDs. This increase in the number of the substrates and cables may become an obstacle to reduction in size and thickness of the video display device, or may raise assembly cost of the video display device.

The present disclosure provides a video display device which includes a plurality of LEDs capable of independently dimming, and can achieve reduction in size, thickness, and assembly cost of the device.

A video display device according to an aspect of the present disclosure includes a liquid crystal display panel, and a plurality of light source substrates configured to illuminate the liquid crystal display panel from a rear side of the liquid crystal display panel. Each of the plurality of light source substrates includes a signal input connector that receives a control signal, a plurality of light emitting diodes each of which is provided in correspondence with a corresponding one of areas different from each other in the liquid crystal display panel, a driver element that drives each of the plurality of light emitting diodes in accordance with the control signal such that each of the plurality of light emitting diodes emits light with luminance corresponding to brightness of the corresponding area of an image, and a signal output connector that through-outputs the control signal. The signal output connector of a first light source substrate included in the plurality of light source substrates, and the signal input connector of a second light source substrate included in the plurality of light source substrates are electrically connected.

According to the video display device of the present disclosure, the plurality of light emitting diodes and the plurality of driver elements are provided on one light source substrate. Accordingly, reduction of substrates and cables, and therefore reduction in size, thickness, and assembly cost of the device can be achieved. In addition, reduction of cables necessary for connection can be realized by cascade connection of the plurality of light source substrates via connection between the signal output connectors and the signal input connectors.

DESCRIPTION OF EMBODIMENTS

Figure 1:
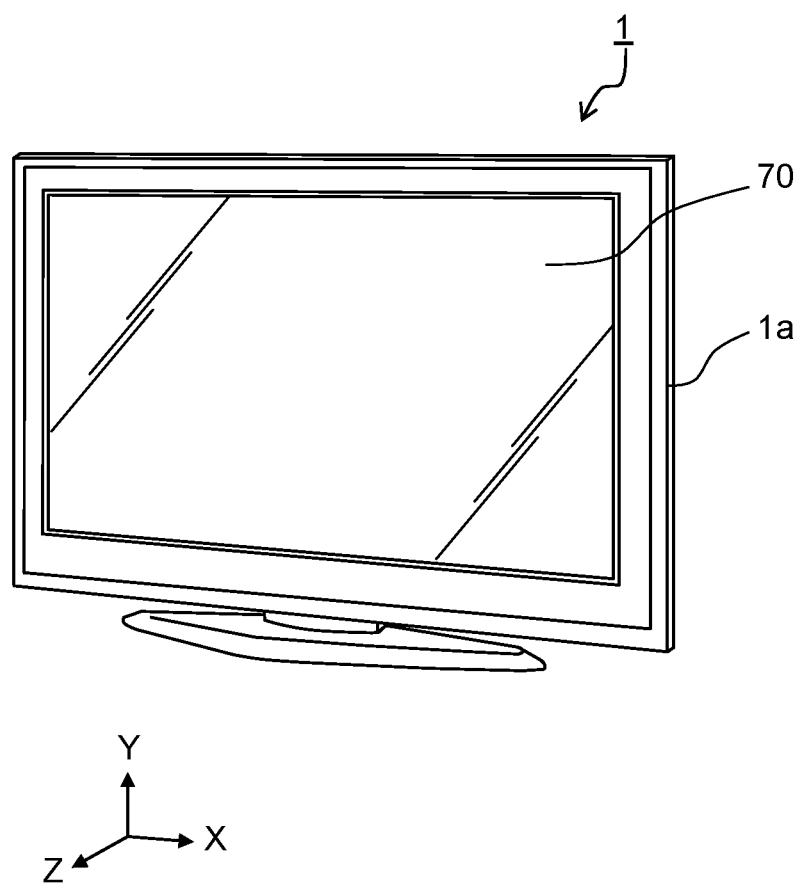
FIG. 1 is a view schematically illustrating an example of an external appearance of a video display device according to a first exemplary embodiment.

A video display device according to an aspect of the present disclosure includes a liquid crystal display panel, and a plurality of light source substrates configured to illuminate the liquid crystal display panel from a rear side of the liquid crystal display panel. Each of the plurality of light source substrates includes a signal input connector that receives a control signal, a plurality of light emitting diodes each of which is provided in correspondence with a corresponding one of areas different from each other in the liquid crystal display panel, a driver element that drives each of the plurality of light emitting diodes in accordance with the control signal such that each of the plurality of light emitting diodes emits light with luminance corresponding to brightness of the corresponding area of an image, and a signal output connector that through-outputs the control signal. The signal output connector of a first light source substrate included in the plurality of light source substrates, and the signal input connector of a second light source substrate included in the plurality of light source substrates are electrically connected.

According to this configuration, the plurality of light emitting diodes and a plurality of the driver elements are provided on one light source substrate. Accordingly, reduction of substrates and cables, and therefore reduction in size, thickness, and assembly cost of the device can be achieved. In addition, reduction of cables necessary for connection can be realized by cascade connection of the plurality of light source substrates via connection between the signal output connectors and the signal input connectors.

Each of the plurality of light source substrates may belong to any one of a plurality of signal systems. The video display device may further include a signal processing substrate that generates the control signal for each of the signal systems. The plurality of light source substrates that belong to the same one of the signal systems may be connected in series via cable connection provided between the signal output connector and the signal input connector of adjacent ones of the light source substrates, and allow the control signal generated by the signal processing substrate for the corresponding signal system to be transmitted in series between the corresponding light source substrates.

According to a configuration which transmits a control signal between a plurality of light source substrates connected in series, loads (the number of driver elements to which one control signal is distributed) is generally limited to reduce waveform distortion of the control signal to be transmitted. Accordingly, a limit is set to the number of light emitting diodes (hereinafter, also referred to as channel number) subjected to independent luminance control in this configuration.

On the other hand, according to the configuration described above, a control signal is transmitted in series between the adjacent ones of the light source substrates for each of the plurality of signal systems included in the configuration. In this case, reduction in size, thickness, and assembly cost of the device can be achieved while increasing the channel number.

Each of the plurality of light source substrates may further include a cascade input connector that receives the control signal, and a cascade output connector that through-outputs the control signal. A plurality of the light source substrates functioning as representative light source substrates may be provided such that each of the light source substrates functioning as the representative light source substrates is associated with the corresponding one of the signal systems. The plurality of representative light source substrates may be connected in series via cable connection provided between the cascade output connector and the cascade input connector of adjacent ones of the representative light source substrates, and allow the control signal generated by the signal processing substrate for the plurality of the signal systems to be transmitted in series between the corresponding representative light source substrates. Each of the plurality of representative light source substrates may output, to the signal output connector, the control signal of the signal system to which the corresponding representative light source substrate belongs.

According to this configuration, a control signal controlling the plurality of signal systems is supplied from the signal processing substrate to only one of the representative light source substrates, and transmitted in series between the adjacent ones of the representative light source substrates. The control signal controlling the respective signal systems is further transmitted in series between the adjacent ones of the light source substrates in each of the signal systems. In this case, limitations to positioning of the signal processing substrate (such as the necessity of positioning the signal processing substrate at a substantially equal distance from all signal systems) decrease, wherefore the degree of freedom in positioning of the substrates increases. Moreover, cables necessary for transmission of the control signal become relatively short. Accordingly, the size, thickness, and assembly cost of the device can be further decrease.

The plurality of light source substrates may be disposed in matrix. The light source substrates disposed in a row or a column may belong to one of the signal systems. Each of the representative light source substrates of the plurality of signal systems may be disposed at an end of the row or the column.

According to this configuration, the plurality of light source substrates are disposed in matrix such that each of the representative light source substrates is positioned at the end of the corresponding row or column. Accordingly, a length of cables necessary for transmission of a control signal can be optimized.

Each of the plurality of light source substrates may include a plurality of connectors that belong to an identical circuit node within the corresponding light source substrate such that the respective connectors are disposed at different positions.

This configuration allows selection and use of appropriate connectors not interfering with other members at the time of connection of cables to connectors belonging to a predetermined circuit node. In this case, a plurality of light source substrates having the same configuration can be used even when appropriate connectors are different for each of positions of a plurality of the light sources to be disposed. Accordingly, cost reduction can be achieved by using common substrates.

Each of the plurality of light source substrates may include, as the plurality of connectors, a first power input connector, a second power input connector, a first power output connector, and a second power output connector that belong to an identical power supply node within the corresponding light source substrate. Each of the plurality of light source substrates may belong to any one of a plurality of power supply systems. The video display device may further include a power supply substrate that supplies operation power to the plurality of light source substrates. The plurality of light source substrates that belong to a first power supply system may be connected in series via cable connection provided between the first power output connector and the first power input connector of the adjacent ones of the light source substrates, and allow the operation power supplied from the power supply substrate to be transmitted in series between the corresponding light source substrates. The plurality of light source substrates that belong to a second power supply system may be connected in series via cable connection provided between the second power output connector and the second power input connector of the adjacent ones of the light source substrates, and allow the operation power supplied from the power supply substrate to be transmitted in series between the corresponding light source substrates.

According to this configuration, operation power is transmitted in series between the adjacent ones of the light source substrates for each of the power supply systems. Accordingly, reduction of cables necessary for connection, and therefore reduction in size, thickness, and assembly cost of the device can be achieved. In addition, this configuration allows selection and use of appropriate connectors not interfering with other members for each of the power supply systems at the time of connection of the light source substrates in series. In this case, a plurality of light source substrates having the same configuration can be used for the plurality of power supply systems even when appropriate connectors are different for each of positions of a plurality of the light sources to be disposed. Accordingly, cost reduction can be achieved by using common substrates.

The light emitting diodes and the driver elements may be provided on an identical surface of each of the plurality of light source substrates.

According to this configuration, the light emitting diodes and the driver element are provided on one surface of each of the light source substrates. Accordingly, a process for providing members on the light source substrates in a manufacturing step is more facilitated than in such a case when these members are provided on both surfaces. A reflection plate is provided on one surface of each of the light source substrates to guide light toward corresponding areas from each of the light emitting diodes. This reflection plate may include protrusions functioning as partitions to reduce light leakage between areas associated with the adjacent ones of the light emitting diodes. When these protrusions are hollow and store the driver elements, non-uniformity of luminance caused by interference between the driver elements and the reflection sheet can be prevented. In addition, the driver elements can be provided on each of the light source substrates while effectively utilizing spaces inside the protrusions.

Exemplary embodiments are hereinafter described in detail with reference to the drawings as necessary. However, excessive details may be omitted in the following description. For example, detailed description of well-known matters, and repetitive description of substantially identical configurations may be omitted. This omission is made for avoiding excessive redundancy of the following description, and facilitating understanding by those skilled in the art.

Note that each of the exemplary embodiments described herein is only presented as a specific example of the present disclosure. Numerical values, shapes, materials, constituent elements, and positions and connection manners of the constituent elements included in the following exemplary embodiments are presented by way of example, and not intended to limit the subject matters of the present disclosure. In addition, constituent elements included in the following exemplary embodiments and not contained in the independent claims defining the highest concepts are described as optional constituent elements.

Note that the accompanying drawings and the following description are presented to help those skilled in the art fully understand the present disclosure. It is therefore not intended that the subject matters defined in the appended claims be limited to those drawings and description.

Moreover, the respective figures are schematic views and not necessarily precise depictions. Furthermore, substantially identical constituent elements in the respective figures have been given identical reference numbers. Description of these elements are omitted or simplified in some cases.

(First Exemplary Embodiment)

Video display device 1 according to a first exemplary embodiment is hereinafter described with reference to FIGS. 1 through 8. It is assumed that three axes of X axis, Y axis, and Z axis are defined in the respective figures in this exemplary embodiment. The X axis is an axis extending in a direction in parallel with a long side of a liquid crystal display panel. The Y axis is an axis extending in a direction in parallel with a short side of the liquid crystal display panel. The Z axis is an axis perpendicular to both the X and Y axes. However, these axes are defined only for convenience and not intended to limit the present disclosure.

[1-1. Configuration]

Video display device 1 according to the first exemplary embodiment includes a liquid crystal display panel, and light source substrates for illuminating the liquid crystal display panel from a rear side of the liquid crystal display panel. Video display device 1 is presented as an example of a video display device. Each of the light source substrates includes a plurality of LEDs each of which is provided in corresponding one of areas different from each other in the liquid crystal display panel, and further includes driver elements which drive (dim) each of the plurality of LEDs such that light is emitted with luminance corresponding to brightness within the corresponding area of an image in accordance with a control signal. Note that brightness within the corresponding area of an image in this context refers to brightness of the image in the area of the liquid crystal display panel illuminated by one LED (or LED disposed in one portion) (i.e., partial brightness of the image in the area corresponding to the LED).

FIG. 1 is a view schematically illustrating an example of an external appearance of video display device 1 according to the first exemplary embodiment.

As illustrated in FIG. 1, video display device 1 has an external appearance of an ordinary flat panel display, and includes liquid crystal display panel 70 and light source substrates (not shown in FIG. 1). Display panel 70 and the light source substrates are stored in housing 1a having an opened front surface. According to this exemplary embodiment, surfaces of video display device 1 and respective constituent members of video display device 1 on the side facing a user (surfaces on the side illustrated in FIG. 1) are referred to as front surfaces, while surfaces on the side opposite to the front surfaces (back surfaces) are referred to as rear surfaces.

Figure 2:
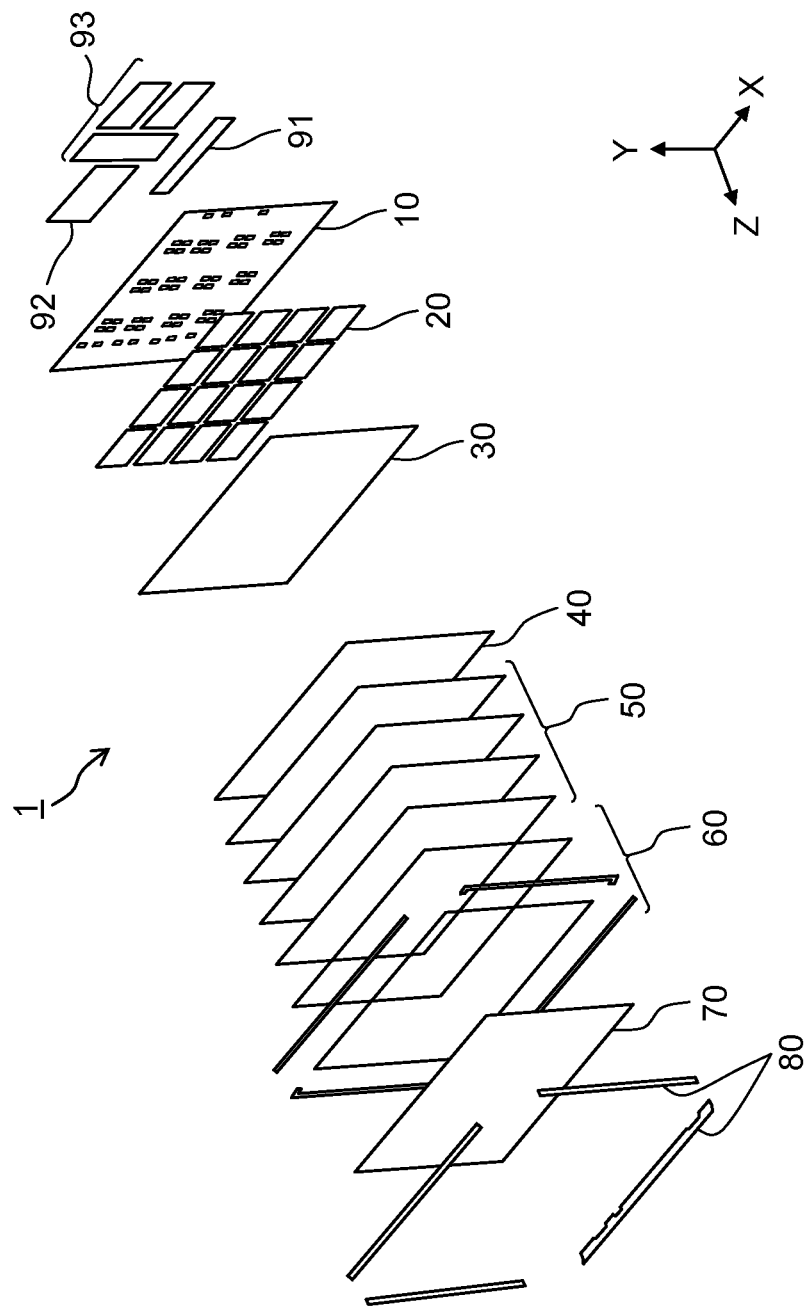
FIG. 2 is an exploded perspective view schematically illustrating an example of a configuration of the video display device according to the first exemplary embodiment.

FIG. 2 is an exploded perspective view schematically illustrating an example of a configuration of video display device 1 according to the first exemplary embodiment.

As illustrated in FIG. 2, video display device 1 includes base plate 10, a plurality of light source substrates 20, reflection sheet 30, flatter 40, various types of optical sheets 50, mold frame 60, liquid crystal display panel 70, bezel 80, connection terminal substrate 91, signal processing substrate 92, and power supply substrate 93. These members are stored in housing 1a (see FIG. 1) to constitute video display device 1. Note that video display device 1 further includes a support member, a fastening member, a reinforcing member and the like not shown in the figures, besides the foregoing members.

Base plate 10 is a base to which light source substrates 20, connection terminal substrate 91, signal processing substrate 92, and power supply substrate 93 are attached. Base plate 10 is made of sheet metal, for example, but may be made of other materials. Screw holes, openings described below, and others are provided in base plate 10.

Light source substrates 20 constitute a backlight module illuminating liquid crystal display panel 70. Each of light source substrates 20 includes a plurality of LEDs, and a plurality of driver elements for driving each of the plurality of LEDs. These LEDs and driver elements are provided on the same surface of light source substrate 20. The plurality of light source substrates 20 may have a uniform shape. Light source substrate 20 will be detailed below.

The plurality of light source substrates 20 included in video display device 1 are disposed in matrix within the same plane. Each of the plurality of light source substrates 20 is attached to a front surface of base plate 10 (surface on the side toward liquid crystal display panel 70). More specifically, each of light source substrates 20 is arranged on the front surface of base plate 10 in a first direction, and arranged in a second direction perpendicular to the first direction. Hereinafter, the first direction is also referred to as a "row", while the second direction is also referred to as "column". Accordingly, the plurality of light source substrates 20 are disposed in each of rows and columns to be arranged in a matrix shape on the front surface of base plate 10. According to video display device 1, the plurality of light source substrates 20 thus provided constitute a backlight to illuminate liquid crystal display panel 70.

Note that the first direction (row) may be a direction in parallel with a long side of liquid crystal display panel 70, while the second direction (column) may be a direction in parallel with a short side of liquid crystal display panel 70. The respective directions may be switched to the opposite directions.

Reflection sheet 30 is disposed on the front surfaces of light source substrates 20 (surfaces on the side toward liquid crystal display panel 70). Reflection sheet 30 includes openings through which LEDs (LEDs 21 of light source substrates 20 illustrated in FIG. 3) penetrate. Reflection sheet 30 is a sheet configured such that a part of light emitted from the LEDs and reflected on reflection sheet 30 travels toward liquid crystal display panel 70. Reflection sheet 30 is made of white synthetic resin, for example, but may be made of other white materials. Hollow protrusions having a protruding shape toward the front side (toward liquid crystal display panel 70) for separating the adjacent ones of the LEDs are formed in reflection sheet 30 (see FIG. 4). In this case, each periphery of the LEDs is surrounded by the corresponding protrusions, wherefore each of the LEDs illuminates an area surrounded by the corresponding protrusions around the LED. Reflection sheet 30 will be detailed below.

Flatter 40 is an optical sheet disposed on the front surface of reflection sheet 30 (surface on the side toward liquid crystal display panel 70) to improve uniformity of luminance in each of the areas illuminated by the corresponding LEDs (areas surrounded by the protrusions of reflection sheet 30). Flatter 40 transmits light emitted from the LEDs not uniformly, but with distribution of light transmittance (hereinafter also abbreviated as "transmittance") produced in each of the areas illuminated by the LEDs. Note that distribution of transmittance in this exemplary embodiment refers to a state of a presence of distribution containing relatively high-transmittance portions and relatively low-transmittance portions. Flatter 40 is made of synthetic resin, for example, but may be made of other materials. When flatter 40 is absent, variations in luminance (luminance distribution) may be produced in each of the areas illuminated by the LEDs of light source substrates 20 in a state that each of the LEDs of light source substrates 20 is a point light source constituted by the LED. Flatter 40 is configured to produce transmittance distribution capable of canceling the luminance distribution in each area. Accordingly, uniformity of luminance in each of the areas illuminated by the LEDs can improve. Flatter 40 will be detailed below.

Optical sheets 50 are sheets having various types of optical functions other than the function of flatter 40. For example, optical sheets 50 include a diffusion plate which diffuses light to further increase uniformity of luminance, a prism sheet which equalizes traveling routes of light into a frontward direction to increase luminance visually recognized by the user, and others. For example, optical sheets 50 may be constituted by synthesis resin on which surface fine shapes corresponding to respective functions are formed.

Mold frame 60 is a support member which supports an outer periphery of liquid crystal display panel 70 from the rear surface. Mold frame 60 is made of synthetic resin, for example, but may be made of other materials. In addition, mold frame 60 may be fixed to base plate 10.

Liquid crystal display panel 70 is a liquid crystal display panel for image display, including a plurality of liquid crystal pixels arranged in matrix.

Bezel 80 is a support member which supports the outer periphery of liquid crystal display panel 70 from the front surface. Bezel 80 is made of metal, for example, but may be made of synthetic resin.

Connection terminal substrate 91 is a circuit substrate which includes terminals and an interface circuit for receiving image signals. Signal processing substrate 92 is a circuit substrate which includes a signal processing circuit for processing image signals. Signal processing substrate 92 further includes a circuit which generates control signals for controlling (dimming) luminance of the LEDs of light source substrates 20 based on image signals. Power supply substrate 93 is a circuit substrate which includes a power supply circuit for supplying operation power (hereinafter also abbreviated as "power") to video display device 1. Connection terminal substrate 91, signal processing substrate 92, and power supply substrate 93 are attached to the rear surface of base plate 10.

Light source substrates 20 are hereinafter described.

Figure 3:
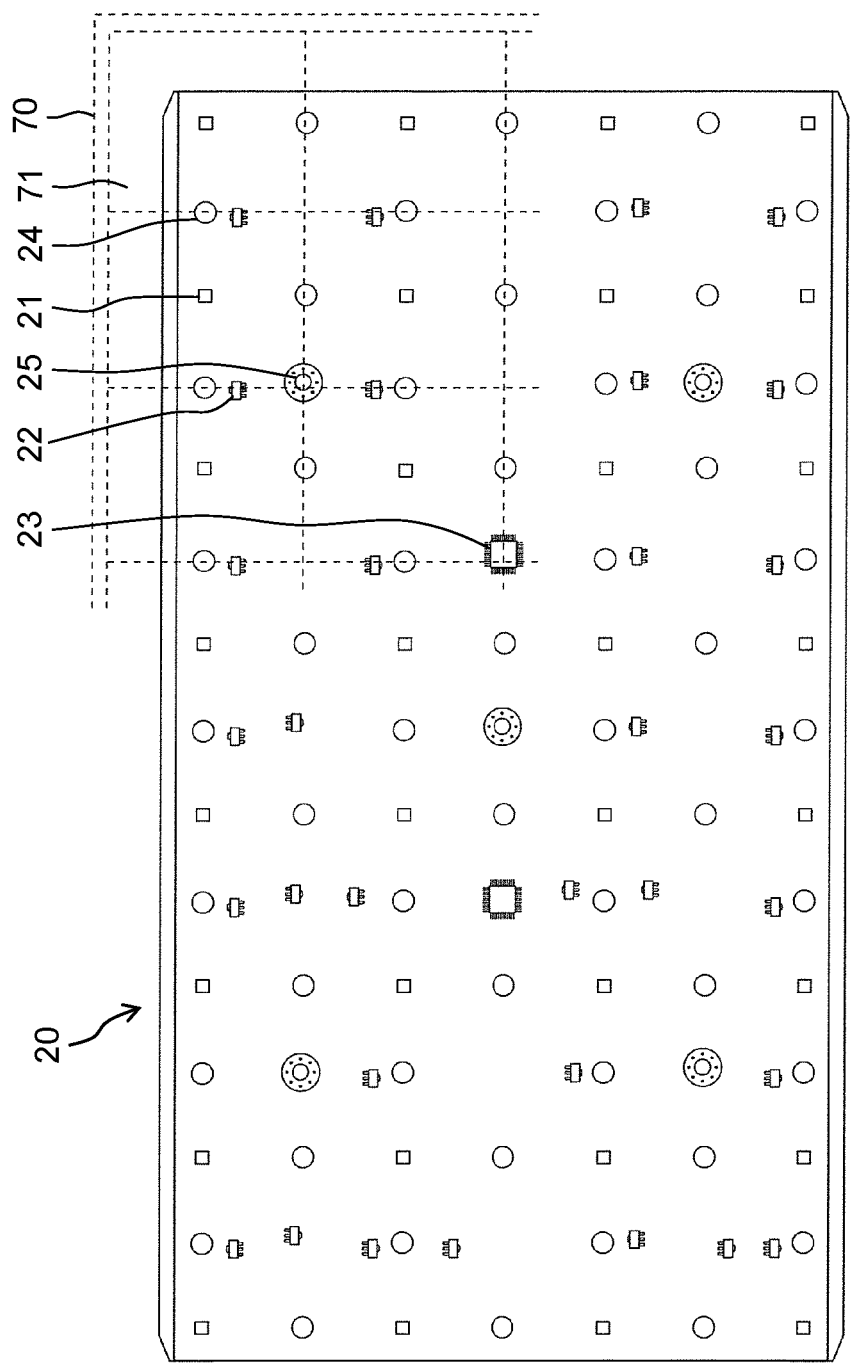
FIG. 3 is a plan view schematically illustrating an example of a configuration of a light source substrate included in the video display device according to the first exemplary embodiment.

FIG. 3 is a plan view schematically illustrating an example of a configuration of each of light source substrates 20 included in video display device 1 according to the first exemplary embodiment. Note that FIG. 3 illustrates an example of respective members disposed on the front surface of light source substrate 20. In addition, positions corresponding to areas 71 of liquid crystal display panel 70 illuminated by respective LEDs 21 are indicated by broken lines in a part of FIG. 3 for convenience to facilitate visual understanding.

As illustrated in FIG. 3, the plurality of LEDs 21 and a plurality of driver elements 22 and driver elements 23 are provided on the same surface of light source substrate 20 (front surface of light source substrate 20).

Each of LEDs 21 is provided on corresponding one of areas 71 different from each other in liquid crystal display panel 70. According to video display device 1 of this exemplary embodiment, each of LEDs 21 is constituted by a high-voltage LED. The high-voltage LED in this context, for example, refers to an LED constituted by a plurality of LED elements (i.e., a plurality of pn junctions) connected in series. The high-voltage LED is an LED to which higher voltage is applicable than a single LED element (low-voltage LED). Moreover, when higher voltage is applied, the high-voltage LED can provide higher light emission luminance than a single LED element in a state of flow of substantially the same current. In this case, the high-voltage LED requires smaller current than the current flowing in the low-voltage LED to obtain the same light emission luminance by the high-voltage LED as the light emission luminance by the low-voltage LED. Accordingly, in case of electric connection of the plurality of light source substrates 20 (cascade connection) of video display device 1, heat generated by wiring or the like can be suppressed, wherefore a load imposed on a power supply for supplying power to light source substrates 20 lowers.

As described above, light source substrate 20 can obtain higher light emission luminance while reducing a rise of driving current of the LEDs 21, thereby suppressing heat generated by driver elements 22 and driver elements 23. Accordingly, LEDs 21, and driver elements 22 and driver elements 23 can be mounted on one light source substrate 20.

Note that the high-voltage LED in this context refers to an LED driven at driving voltage in a range from 10 (V) to 50 (V) inclusive, for example. According to video display device 1 of this exemplary embodiment, as the high-voltage LED, an LED driven at a voltage ranging from 20 (V) to 40 (V) inclusive may be used. On the other hand, a low-voltage LED is an LED driven at a voltage ranging from 3 (V) to 6 (V) inclusive, for example.

Each of driver elements 22 and driver elements 23 is a semiconductor element for driving LEDs 21 based on a control signal supplied from signal processing substrate 92. Each of driver elements 22 and driver elements 23 receives a control signal indicating luminance of light emitted from respective LEDs 21. In this case, driver element 22 and driver element 23 drive (dim) corresponding LED 21 in accordance with the control signal such that light is emitted with luminance corresponding to brightness of corresponding area 71 of an image. Each of driver elements 22 may be constituted by a metal-oxide semiconductor (MOS) transistor, for example. In addition, each of driver elements 23 may be constituted by a semiconductor integrated circuit (IC) which generates a gate signal of driver element 22 from a control signal, for example.

As described above, signal processing substrate 92 may generate a control signal indicating brightness of each of areas 71 of an image. In this case, each of driver elements 22 and driver elements 23 may drive corresponding LED 21 such that light is emitted with luminance representing brightness indicated by the control signal and corresponding to area 71 associated with corresponding LED 21.

In addition, signal processing substrate 92 may generate a control signal indicating luminance of light emitted from LED 21 associated with each of areas 71 in accordance with brightness of corresponding area 71 of an image. In this case, driver element 22 and driver element 23 may drive corresponding LED 21 such that light is emitted with luminance indicated by the control signal.

In light source substrate 20, openings 24 which receive support pins for supporting flatter 40 to stand the support pins thereon, and screw holes 25 which receive screws fastened to fix light source substrate 20 to base plate 10 are formed.

Each of driver elements 22, driver elements 23, openings 24, and screw holes 25 on light source substrate 20 are disposed on boundaries of adjoining ones of areas 71. Advantageous effects offered from this layout will be described below.

Reflection sheet 30 is hereinafter described.

Figure 4:
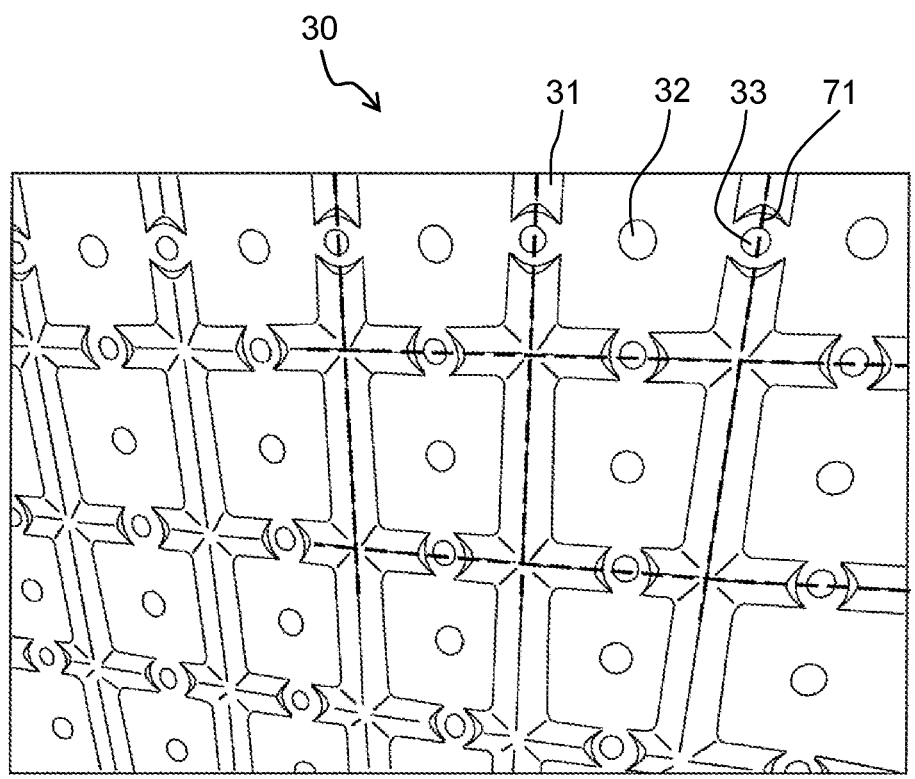
FIG. 4 is a perspective view schematically illustrating an example of a shape of a reflection sheet included in the video display device according to the first exemplary embodiment.

FIG. 4 is a perspective view schematically illustrating an example of a shape of reflection sheet 30 included in video display device 1 according to the first exemplary embodiment. Positions corresponding to areas 71 are indicated by broken lines in a part of FIG. 4 for facilitating visual understanding.

As illustrated in FIG. 4, protrusions 31, openings 32, and openings 33 are formed in reflection sheet 30.

Openings 32 are provided at positions corresponding to LEDs 21 of light source substrate 20 disposed on the rear side of reflection sheet 30. LEDs 21 are exposed from the rear surface of reflection sheet 30 through openings 32 toward the front surface of reflection sheet 30.

Reflection sheet 30 is made of white synthetic resin to reflect light emitted from LEDs 21. Light is emitted from LEDs 21 penetrating openings 32 and exposed to the front surface, a part of which light (such as light traveling rearward) is reflected on reflection sheet 30 toward the front side (toward liquid crystal display panel 70).

Each of protrusions 31 is hollow and formed at a position separating adjacent ones of openings 32 (i.e., adjacent ones of LEDs 21). More specifically, each of protrusions 31 is formed on the boundary of areas 71 illuminated by corresponding adjacent ones of LEDs 21 (adjoining ones of areas 71) except for a part of the boundary.

Each of openings 33 is formed in reflection sheet 30 at the portion not provided with protrusion 31 on the boundary of corresponding adjoining ones of areas 71. Each of the support pins penetrates opening 33, and opening 24 of light source substrate 20 to be fixed to base plate 10.

Flatter 40 is hereinafter described.

Figure 5:
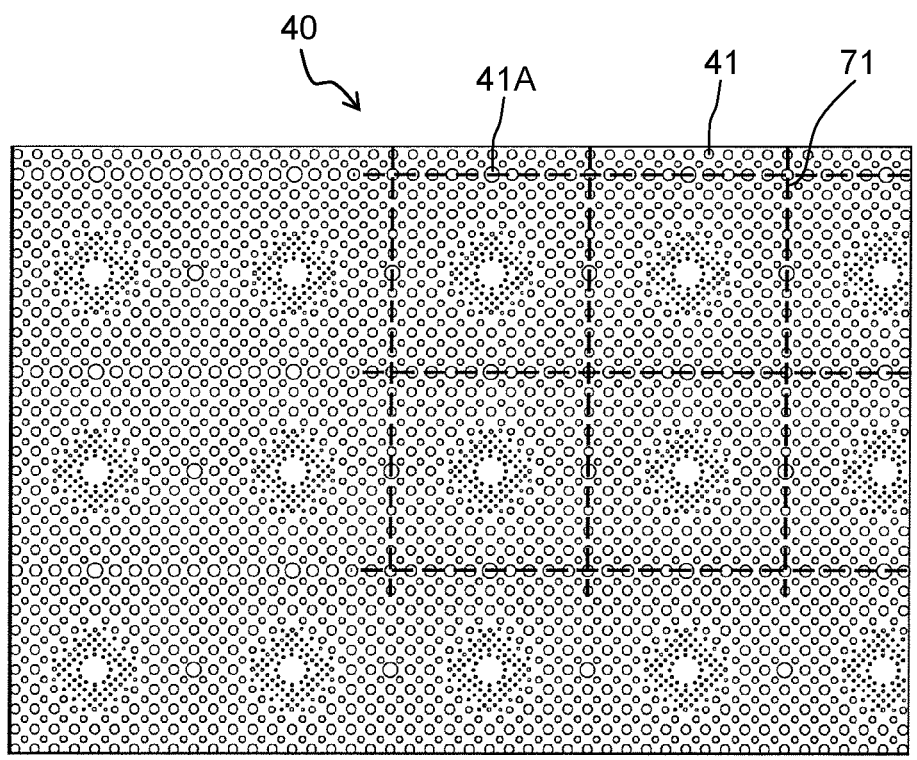
FIG. 5 is a plan view schematically illustrating an example of a shape of a flatter included in the video display device according to the first exemplary embodiment.

FIG. 5 is a plan view schematically illustrating an example of a shape of flatter 40 included in video display device 1 according to the first exemplary embodiment. Positions corresponding to areas 71 are indicated by broken lines in a part of FIG. 5 for facilitating visual understanding.

As illustrated in FIG. 5, holes 41 in various sizes are formed in a sheet of flatter 40 made of synthetic resin. Flatter 40 controls transmittance of light by using holes 41. More specifically, flatter 40 has distribution of transmittance within areas 71 in accordance with a layout (size, position, number) of holes 41. Distribution of transmittance of flatter 40 is so designed as to cancel luminance distribution (luminance variations) which may be produced by LEDs 21 within areas 71 when flatter 40 is absent. This configuration of flatter 40 can improve uniformity of luminance within areas 71.

Attachment of reflection sheet 30 to light source substrate 20, and a layout of respective members are hereinafter described.

Figure 6:
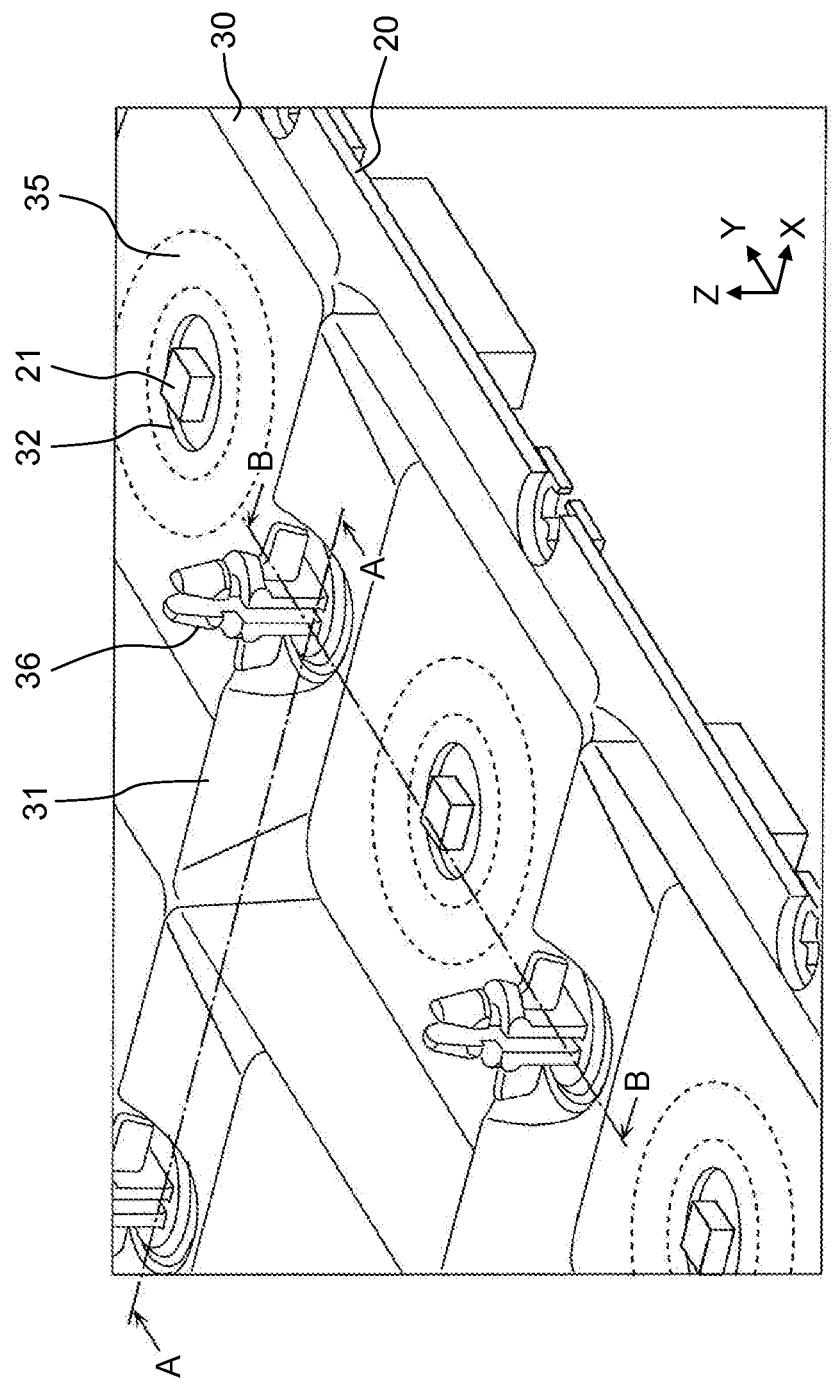
FIG. 6 is a perspective view schematically illustrating an example of attachment of the reflection sheet to the light source substrate in the video display device according to the first exemplary embodiment.

FIG. 6 is a perspective view schematically illustrating an example of attachment of reflection sheet 30 to light source substrate 20 in video display device 1 according to the first exemplary embodiment.

Figure 7:
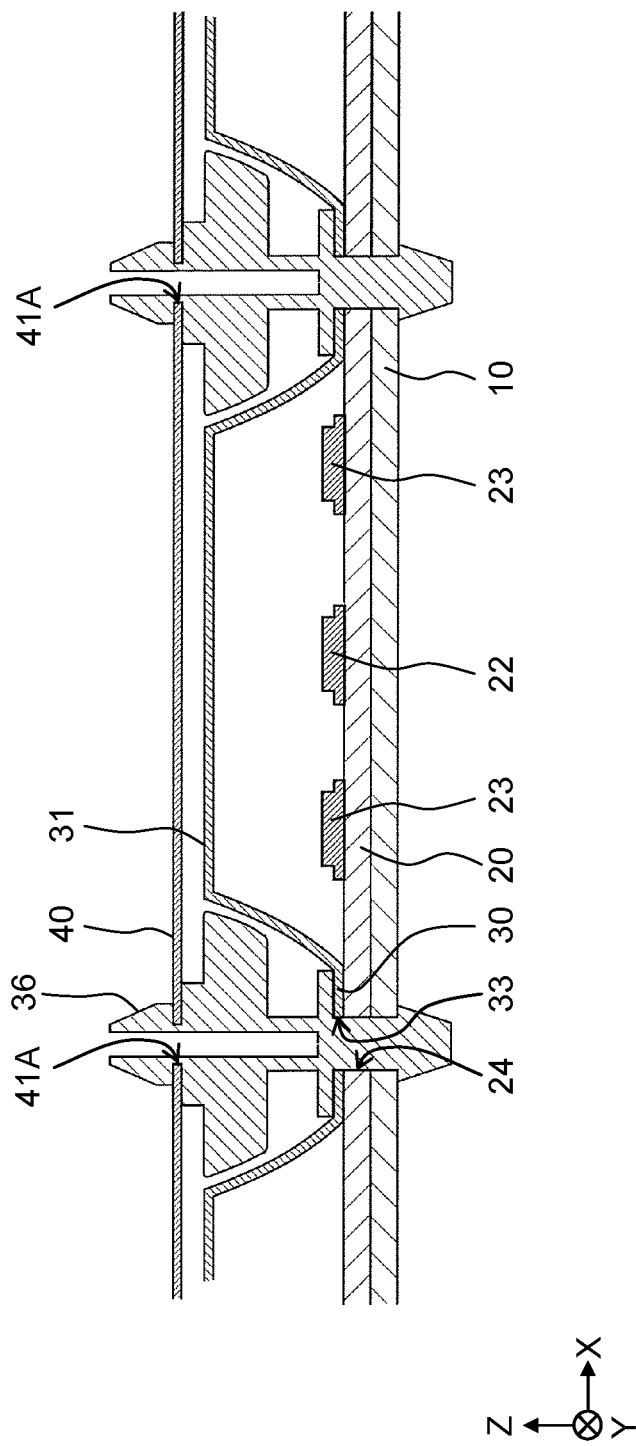
FIG. 7 is a cross-sectional view schematically illustrating an example of a layout of members including the light source substrate, the reflection sheet, and the flatter in the video display device according to the first exemplary embodiment.
Figure 8:
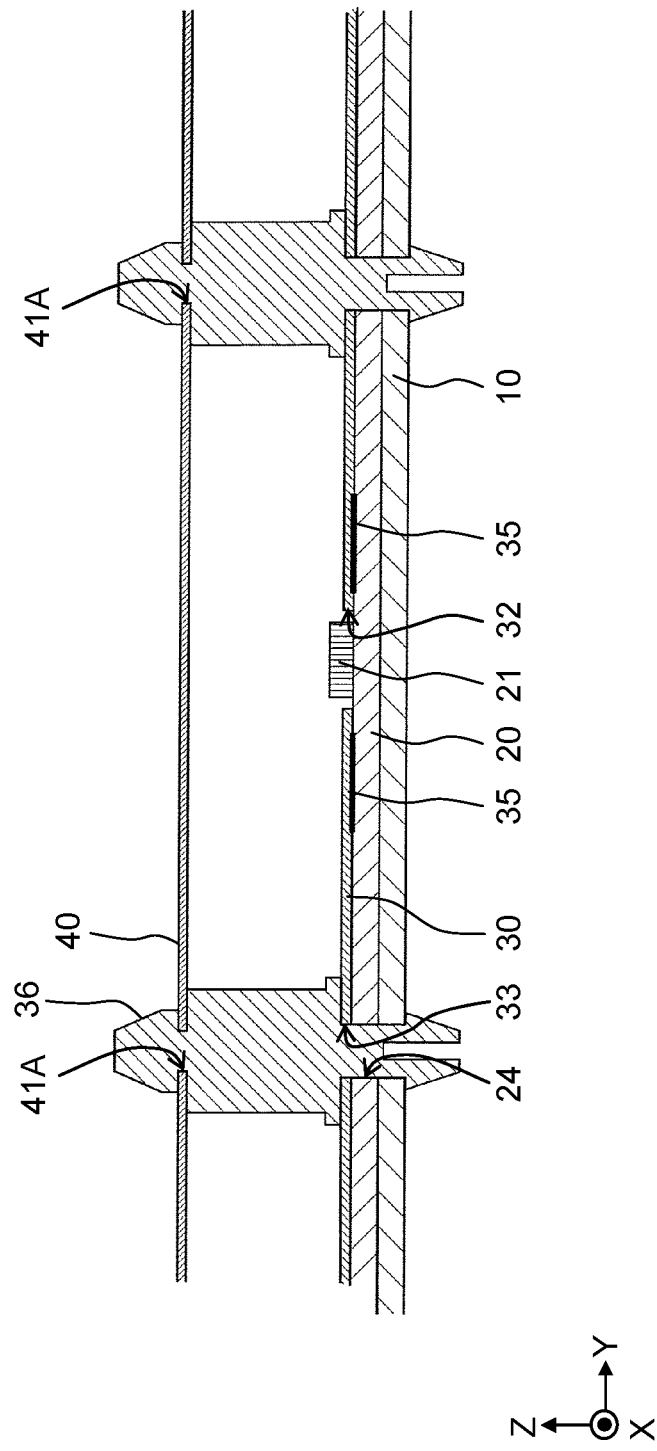
FIG. 8 is a cross-sectional view schematically illustrating an example of a layout of members including the light source substrate, the reflection sheet, and the flatter in the video display device according to the first exemplary embodiment.

FIGS. 7 and 8 are cross-sectional views schematically illustrating an example of a layout of members including light source substrate 20, reflection sheet 30, and flatter 40 in video display device 1 according to the first exemplary embodiment. FIG. 7 illustrates a cross-sectional view taken along a line A-A in FIG. 6, while FIG. 8 illustrates a cross-sectional view taken along a line B-B in FIG. 6. FIG. 6 does not show flatter 40, while FIGS. 7 and 8 show flatter 40.

As illustrated in FIGS. 6, 7, and 8, reflection sheet 30 is affixed to light source substrate 20 via adhesive tapes 35 at flat portions of reflection sheet 30 around openings 32, and also fixed to light source substrate 20 via support pins 36 penetrating openings 24 and openings 33 and attached to base plate 10. Reflection sheet 30 is joined to light source substrate 20 in this manner.

LEDs 21 of light source substrate 20 penetrate from the rear surface of reflection sheet 30 through openings 32 to be exposed to the front surface of reflection sheet 30. Driver elements 22 and driver elements 23 of light source substrate 20 are stored in spaces formed inside protrusions 31 (spaces formed by the presence of protrusions 31 between the rear surface of reflection sheet 30 and the front surface of light source substrate 20).

While not shown in FIGS. 6 through 8, light source substrate 20 is fixed to base plate 10 via screws passing through screw holes 25 (see FIG. 3) and attached to base plate 10. In this case, heads of the screws are also stored within the spaces of protrusions 31.

Flatter 40 is disposed on the front side of reflection sheet 30 while supported by support pins 36. More specifically, flatter 40 is supported by support pins 36 in a state that specific holes 41A of flatter 40 are embedded into notches formed in upper portions of support pins 36. Note that, in FIGS. 7 and 8, a plurality of holes 41 (see FIG. 5) formed in flatter 40 are omitted. Light source substrate 20, reflection sheet 30, and flatter 40 are joined to each other into one structure body in the foregoing manner. Provided thereafter are various types of optical sheets 50 on the front side of the structure body, and liquid crystal display panel 70 on the front side of optical sheets 50 to constitute video display device 1 as illustrated in FIG. 2. According to video display device 1, liquid crystal display panel 70 is illuminated from the rear side with more uniform light emitted from LEDs 21 of light source substrate 20 and passing through flatter 40 and the plurality of optical sheets 50. In this case, brightness of the light illuminating liquid crystal display panel 70 from the rear side is controlled (dimmed) for each area 71 in accordance with images. Accordingly, images having more accurate contrast are displayed on liquid crystal display panel 70.

[1-2. Effects and Others]

Video display device 1 having this configuration can offer following advantageous effects.

Initially, video display device 1 is suited for an aim of reducing size, thickness, and assembly cost.

Assumed herein for comparison with video display device 1 is a video display device which includes a backlight containing several hundreds or more of LEDs, and capable of independently controlling the plurality of LEDs similarly to video display device 1. According to this video display device, a substrate on which the plurality of LEDs are provided, and a substrate on which driver elements are provided are separated from each other. The respective substrates are connected to each other via cables to independently control each luminance of the plurality of LEDs. However, the video display device having this configuration requires numerous substrates and cables, and therefore is difficult to reduce the size and thickness of the video display device. In addition, assembly cost of the video display device may increase.

According to video display device 1 presented in this exemplary embodiment, the plurality of LEDs 21, and the plurality of driver elements 22 and driver elements 23 are provided on one light source substrate 20. In this case, reduction of substrates and cables can be realized, and therefore reduction in size, thickness, and assembly cost of video display device 1 can be achieved.

According to video display device 1, a high-voltage LED constituted by including a plurality of LED elements connected in series may be used as each of LEDs 21. When the high-voltage LED is used, driving voltage of LEDs 21 of light source substrate 20 can increase in comparison with use of an LED other than the high-voltage LED (low-voltage LED). In this case, light source substrate 20 can obtain higher light emission luminance while suppressing a rise of driving current. Accordingly, heat generated from the driver elements can be suppressed.

In some cases, LEDs and driver elements are difficult to be provided on one substrate for a reason of difficulty in design for heat radiation or other reasons. However, video display device 1 which includes the high-voltage LED constituting LEDs 21 allows the plurality of LEDs 21 and the plurality of driver elements 22 and 23 to be provided on one light source substrate 20.

In addition, according to video display device 1, protrusions 31 are formed on reflection sheet 30 to separate adjacent ones of LEDs 21. Driver elements 22 and driver elements 23 are stored within protrusions 31.

When unnecessary wrinkles, bulges or the like are produced on reflection sheet 30 by the presence of the driver elements or the like, luminance non-uniformity may be caused within areas 71. According to video display device 1, however, driver elements 22 and driver elements 23 are stored within the spaces formed by protrusions 31 on the rear side of reflection sheet 30. In this case, luminance non-uniformity caused by interference between the driver elements and reflection sheet 30 can be prevented. Accordingly, driver elements 22 and driver elements 23 of video display device 1 can be provided on light source substrate 20 by effectively utilizing spaces inside protrusions 31.

In addition, according to video display device 1 which includes protrusions 31 to separate adjoining ones of areas 71, mutual light leakage between areas 71 illuminated by adjacent ones of LEDs 21 decreases. This decrease in leakage of light can improve accuracy of brightness of respective areas 71 produced by LEDs 21. Accordingly, illumination of liquid crystal display panel 70 with more accurate luminance can be realized.

In addition, in video display device 1, protrusions 31 are formed on the boundaries of areas 71 illuminated by adjacent ones of LEDs 21 except for a part of the boundaries. Support pins 36 for supporting flatter 40 are attached to base plate 10 while penetrating portions not provided with protrusions 31 in reflection sheet 30. In this case, shadows of support pins 36 are less likely to appear within areas 71, wherefore it can be suppressed that the presence of support pins 36 becomes the cause of lowering of luminance within areas 71.

In addition, central portions of the boundaries of adjoining ones of areas 71 are relatively close to LEDs 21, and therefore exhibit relatively high brightness. According to video display device 1, support pins 36 are provided in the central portions (substantially central portions). In this case, lowering of luminance caused by the presence of support pins 36 becomes less noticeable than in a case when support pins 36 are provided at ends of the boundaries in regions relatively far from LEDs 21 and thus exhibiting relatively low brightness.

According to the video display device including the plurality of LEDs capable of independently dimming in this exemplary embodiment described above, reduction in size, thickness, and assembly cost of the video display device can be achieved.

(Second Exemplary Embodiment)

A second exemplary embodiment is hereinafter described with reference to FIGS. 9 and 10.

Video display device 1 (not shown) presented according to the second exemplary embodiment is substantially similar to video display device 1 presented in the first exemplary embodiment, except for that a configuration not disclosed in the first exemplary embodiment is added. The configuration not disclosed in the first exemplary embodiment is chiefly discussed hereinbelow, with appropriate omission of the matters already described in the first exemplary embodiment.

[2-1. Configuration]

Disclosed in the second exemplary embodiment is video display device 1 which includes light source substrate 20 configured to make electric connection with other substrates via cables. According to the second exemplary embodiment, light source substrate 20 has a configuration for connection with cables via connectors appropriately selected, in addition to the configuration of video display device 1 of the first exemplary embodiment.

In the following description, constituent elements substantially similar to the constituent elements included in video display device 1 according to the first exemplary embodiment have been given reference numbers similar to the reference numbers of the constituent elements of the first exemplary embodiment. The description of these constituent elements is omitted.

A plurality of connectors for connection with cables are provided on the rear surface of light source substrate 20. These connectors are used to distribute signals and power between a plurality of light source substrates 20 via cables. This distribution will be described below.

Figure 9:
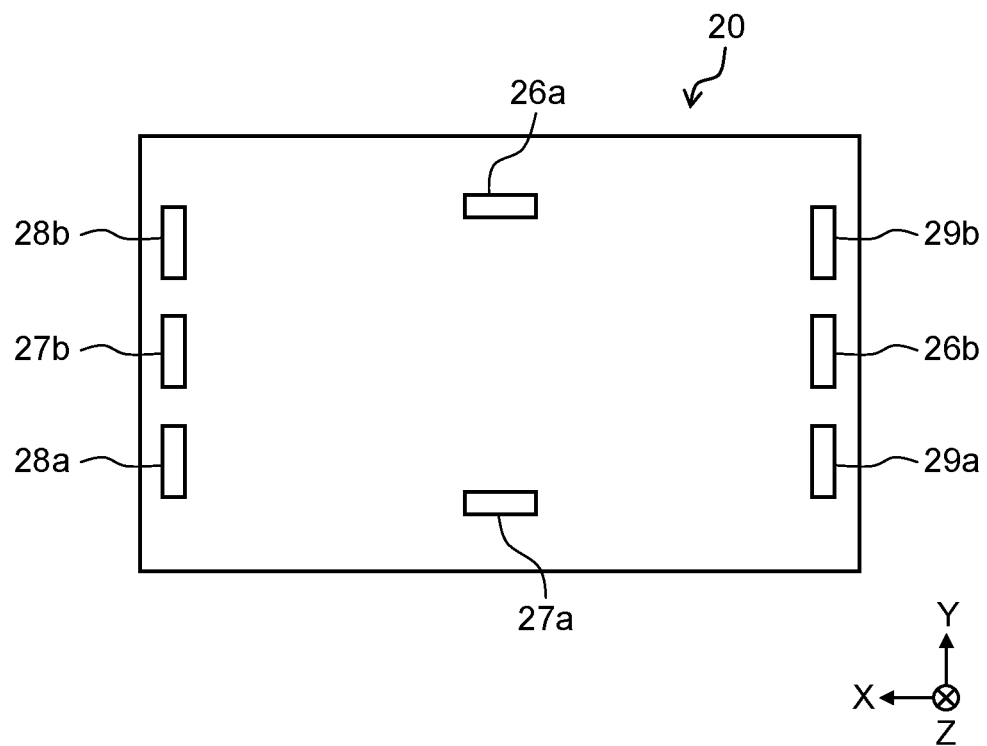
FIG. 9 is a plan view schematically illustrating an example of a layout of connectors provided on a light source substrate in a video display device according to a second exemplary embodiment.

FIG. 9 is a plan view schematically illustrating an example of a layout of connectors provided on light source substrate 20 in video display device 1 according to the second exemplary embodiment. Note that FIG. 9 illustrates a plan view of light source substrate 20 on the rear side.

As illustrated in FIG. 9, light source substrate 20 includes signal input connector 26a, signal input connector 26b, signal output connector 27a, signal output connector 27b, power input connector 28a, power input connector 28b, power output connector 29a, and power output connector 29b. These connectors are disposed at different positions in the rear surface of light source substrate 20.

Each of the connectors adopted herein is a terminal (so-called land pattern) on light source substrate 20 for allowing electric connection with a cable. Cables may be connected to the corresponding connectors directly. Alternatively, cables may be connected to the corresponding connectors via sockets or receptacles attached to the connectors for receiving the cables. In addition, according to light source substrates 20, the connectors for connection of cables can be selected appropriately for positions of respective light source substrates 20. In this case, a connector disposed at a certain position in one light source substrate 20 may receive a cable, but a connector disposed at the same position but in different light source substrate 20 provided at a different location may not receive a cable.

Light source substrate 20 includes wiring (not shown) configured such that a control signal input from signal processing substrate 92 or different light source substrate 20 to signal input connector 26a is distributed to driver elements provided on corresponding light source substrate 20, and also output from both signal output connector 27a and signal output connector 27b (hereinafter also referred to as "through-output"). In addition, light source substrate 20 includes wiring (not shown) through which a control signal input from signal input connector 26b is distributed to driver elements provided on light source substrate 20, and is also through-output from signal output connector 27b.

Accordingly, when a control signal is input to signal input connector 26a of light source substrate 20 from signal processing substrate 92 or different light source substrate 20, this control signal is through-output from both signal output connector 27a and signal output connector 27b. In addition, when a control signal is input to signal input connector 26b of light source substrate 20, this control signal is through-output from signal output connector 27b. Note that these control signals are signals indicating luminance of light emission from each of LEDs 21 to allow light emission of each of LEDs 21 with luminance corresponding to brightness of area 71 associated with corresponding LED 21 in an image. According to light source substrate 20, each of the plurality of LEDs 21 of light source substrate 20 is driven (dimmed) by driver elements 22 and 23 to emit light with luminance corresponding to the control signals.

In addition, light source substrate 20 includes wiring (not shown) configured such that power input from power supply substrate 93 or different light source substrate 20 to power input connector 28a or power input connector 28b is distributed to respective elements provided on corresponding light source substrate 20, and also through-output from power output connector 29a and power output connector 29b.

Accordingly, when power is input from power supply substrate 93 or different light source substrate 20 to either one of power input connector 28a and power input connector 28b, this power is through-output from both power output connector 29a and power output connector 29b of light source substrate 20. Each of the plurality of LEDs 21 of light source substrates 20 is driven by the power thus output.

As described above, light source substrate 20 according to the second exemplary embodiment includes a plurality of connectors at different positions to distribute signals or power. In other words, a plurality of connectors belonging to an identical circuit node within light source substrate 20 are disposed at different positions in light source substrate 20. Signal input connector 26a, signal input connector 26b, signal output connector 27a, and signal output connector 27b are presented as an example of connectors belonging to a circuit node of a control signal system. Power input connector 28a, power input connector 28b, power output connector 29a, and power output connector 29b are presented as an example of connectors belonging to a circuit node of a power system. Accordingly, in case of light source substrate 20 included in video display device 1 of the second exemplary embodiment, for example, connectors can be appropriately selected and used according to the positions of other members. For example, when one connector is unavailable to be used for other member, other connectors can be appropriately selected and used. In this case, video display device 1 of this exemplary embodiment is allowed to include a plurality of light source substrates 20 having the same configuration when the plurality of light source substrates 20 are attached to base plate 10, even when available connectors are different according to the attachment position, for example. As a result, cost reduction can be achieved by using the plurality of light source substrates 20 having the same configuration (i.e., by using common substrates) according to video display device 1 of the second exemplary embodiment.

This configuration shown in the second exemplary embodiment is suitable for a backlight constituted by the plurality of light source substrates 20 electrically connected to each other (cascade connection), for example.

Figure 10:
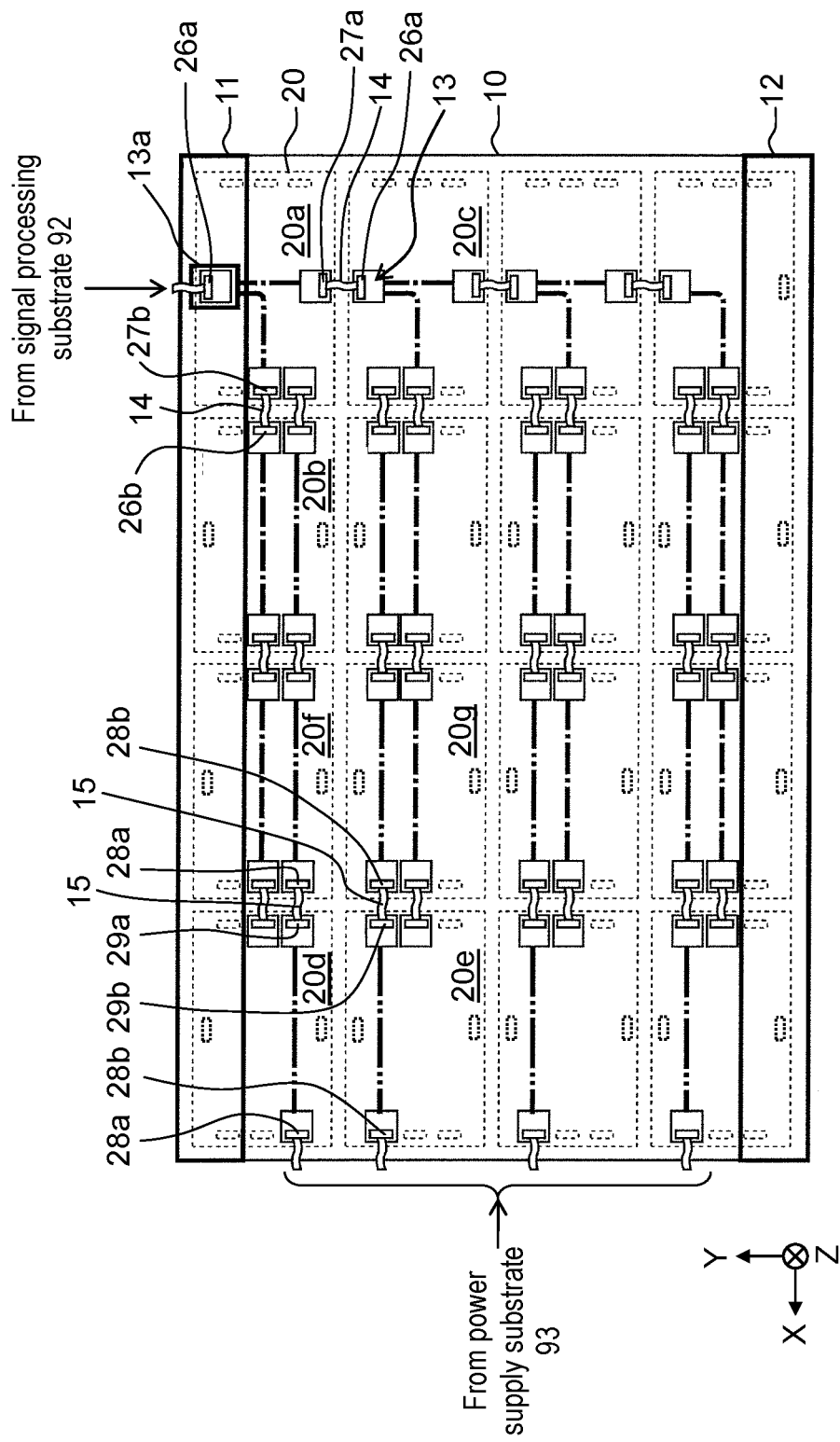
FIG. 10 is a plan view schematically illustrating an example of connection of a plurality of the light source substrates constituting a backlight in the video display device according to the second exemplary embodiment.

FIG. 10 is a plan view schematically illustrating an example of connection of the plurality of light source substrates 20 constituting a backlight in video display device 1 according to the second exemplary embodiment.

The plan view shown in FIG. 10 illustrates the rear side of base plate 10 to which 16 light source substrates 20 are attached by way of example. Light source substrates 20 are attached to the front surface of base plate 10, wherefore attachment positions of light source substrates 20 are indicated by broken lines in FIG. 10. Note that the number of light source substrates 20 attached to base plate 10 is not limited to 16.

As indicated by the broken lines in FIG. 10, the plurality of light source substrates 20 included in video display device 1 are arranged in matrix on base plate 10. More specifically, respective light source substrates 20 are disposed in rows and columns to be arranged in a matrix shape on the front surface of base plate 10 as described in the first exemplary embodiment. In this case, the plurality of light source substrates 20 are electrically connected to each other (cascade connection) via cables 14 or cables 15 as illustrated in FIG. 10.

As illustrated in FIG. 10, reinforcing beam 11 is provided at an upper end of the rear surface of base plate 10, while reinforcing beam 12 is provided at a lower end of the rear surface of base plate 10. A plurality of openings 13 are formed in base plate 10 to allow electric connection between predetermined connectors of light source substrate 20 and other substrates (signal processing substrate 92, power supply substrate 93, or different light source substrate 20) via cables. Reinforcing beam 11 includes opening 13a disposed substantially at the same position as the position of predetermined one of the plurality of openings 13 formed in base plate 10 to allow electric connection between a predetermined connector (such as signal input connector 26a) of one light source substrate 20 (such as light source substrate 20a) and another substrate (such as signal processing substrate 92) via a cable. In this case, respective connectors provided on the rear surfaces of respective light source substrates 20 are exposed to the rear side of base plate 10 through openings 13 formed in base plate 10, or both opening 13 and opening 13a formed in reinforcing beam 11. Accordingly, connectors of respective light source substrates 20 can be electrically connected with each other via cables 14 or cables 15 passing through the rear side of base plate 10.

According to video display device 1 of the second exemplary embodiment, 16 light source substrates 20 are electrically connected with each other via cables 14 and cables 15 to constitute a backlight. Note that seven light source substrates 20 in upper two rows are given reference numbers 20a through 20g in FIG. 10 to simplify the description.

More specifically, as illustrated in FIG. 10, signal output connector 27b of each of light source substrates 20 is electrically connected to signal input connector 26b of neighboring light source substrate 20 on the left side in the figure via cable 14. However, signal output connector 27a of each of four light source substrates 20 at the right end in the figure is electrically connected to signal input connector 26a of light source substrate 20 disposed immediately below in the figure via cable 14. In addition, signal input connector 26a of light source substrate 20a at the right upper end in the figure is electrically connected to signal processing substrate 92 via a cable.

In this case, a control signal supplied from signal processing substrate 92 is input to signal input connector 26a of light source substrate 20a. This control signal is through-output from signal output connector 27a and signal output connector 27b of light source substrate 20a, and input to each of signal input connector 26a of light source substrate 20c and signal input connector 26b of light source substrate 20b via cables 14. Thereafter, the control signal is distributed from one light source substrate 20 to other light source substrates 20 via cables 14 based on the foregoing configuration. Similar distribution is repeated to distribute the control signal supplied from signal processing substrate 92 to all light source substrates 20 included in video display device 1. Note that paths to which control signals are distributed are indicated by alternate long and short dash lines in FIG. 10.

According to video display device 1 of this exemplary embodiment, signal output connectors of a first light source substrate and signal input connectors of a second light source substrate of the plurality of light source substrates 20 are electrically connected to each other. As described above, the signal output connectors of each of light source substrates 20 are electrically connected to the signal input connectors of neighboring light source substrate 20 on the left side or immediately below in the figure via cables 14 for connection between the plurality of light source substrates 20 (cascade connection). Accordingly, one light source substrate 20 functions both as the first light source substrate and the second light source substrate except for a part of light source substrates 20 (such as light source substrate 20a receiving a control signal from signal processing substrate 92, and four light source substrates 20 at the left end in the figure corresponding to final ends of the control signal). Accordingly, definitions of the first light source substrate and the second light source substrate are not absolute definitions but only relative definitions except for a part of light source substrates 20. According to the example illustrated in FIG. 10, for example, light source substrate 20b and light source substrate 20c correspond to the second light source substrates when light source substrate 20a is the first light source substrate. When light source substrate 20b is the first light source substrate, light source substrate 20f corresponds to the second light source substrate. When light source substrate 20c is the first light source substrate, neighboring light source substrates 20 on the left side of light source substrate 20c and immediately below light source substrate 20c (on the left side and immediately below in the figure) correspond to the second light source substrates. As in this manner, the first light source substrates distributes a control signal to the second light source substrate, whereafter the second light source substrate switches to the first light source substrate for the light source substrate disposed downstream to distribute the control signal. This manner of distribution is repeated to distribute the control signal to all light source substrates 20.

Power supplied from power supply substrate 93 is input to four light source substrates 20 disposed at the left end in FIG. 10. However, power input connector 28b and power output connector 29b of each of four light source substrates 20 (light source substrates 20a, 20b, 20d, 20f) disposed in the uppermost row in FIG. 10 are not available by the presence of reinforcing beam 11. Accordingly, power supplied from power supply substrate 93 is input to power input connector 28a of light source substrate 20d disposed in the uppermost row included in the four light source substrates at the left end, instead of power input connector 28b not available by the presence of reinforcing beam 11. On the other hand, corresponding power is input to power input connector 28b of each of other three light source substrates 20 of the four light source substrates at the left end, including light source substrate 20e. This power is through-output from power output connector 29a of light source substrate 20d, instead of power output connector 29b not available by the presence of reinforcing beam 11, and input to power input connector 28a of neighboring light source substrate 20f on the right side in the figure via cable 15. On the other hand, the power is through-output from power output connector 29b of each of other three light source substrates 20 including light source substrate 20e, and input via cable 15 to power input connector 28b of each of neighboring light source substrate 20 on the right side in the figure. The power is distributed from one light source substrate 20 to other light source substrates 20 in this manner. Similar distribution is repeated to distribute the power supplied from power supply substrate 93 to all light source substrates 20 included in video display device 1. Note that paths to which power is distributed are indicated by alternate long and two short dashes lines in FIG. 10.

Light source substrates 20 included in video display device 1 are operated by control signals and power distributed in the manner described above. Each of the plurality of LEDs 21 is driven (dimmed) such that light is emitted with luminance indicated by the distributed control signal.

[2-2. Effects and Others]

As described above, the video display device according to this exemplary embodiment includes a liquid crystal display panel, and a plurality of light source substrates configured to illuminate the liquid crystal display panel from a rear side of the liquid crystal display panel. Each of the plurality of light source substrates includes a signal input connector that receives a control signal, a plurality of LEDs each of which is provided in correspondence with a corresponding one of areas different from each other in the liquid crystal display panel, a driver element that drives each of the plurality of LEDs in accordance with the control signal such that each of the plurality of LEDs emits light with luminance corresponding to brightness of the corresponding area of an image, and a signal output connector that through-outputs the control signal. The signal output connector of a first light source substrate included in the plurality of light source substrates, and the signal input connector of a second light source substrate included in the plurality of light source substrates are electrically connected.

Note that video display device 1 is presented as an example of a video display device. Liquid crystal display panel 70 is presented as an example of the liquid crystal display panel. Light source substrates 20 and light source substrates 20a through 20g are presented as an example of the light source substrates. Each of signal input connector 26a and signal input connector 26b is presented as an example of the signal input connector. LEDs 21 are presented as an example of the LEDs. Each of driver elements 22 and driver elements 23 is presented as an example of the driver elements. Each of signal output connector 27a and signal output connector 27b is presented as an example of the signal output connector. Light source substrates 20 are presented as an example of both the first light source substrate and the second light source substrate.

Each of the plurality of light source substrates may include a plurality of connectors that belong to an identical circuit node within the corresponding light source substrate such that the respective connectors are disposed at different positions.

Note that signal input connector 26a, signal input connector 26b, signal output connector 27a, and signal output connector 27b are presented as an example of the plurality of connectors that belong to an identical circuit node. In addition, power input connector 28a, power input connector 28b, power output connector 29a, and power output connector 29b are presented as an example of the plurality of connectors that belong to an identical circuit node.

According to video display device 1 having this configuration, reduction of cables necessary for connection can be achieved by electric connection of the plurality of light source substrates 20 (cascade connection).

In addition, a plurality of connectors for distributing signals or power are provided at positions different from each other in light source substrate 20. Herewith, connectors can be appropriately selected and used according to the positions of other members. For example, when one connector is unavailable to be used for other member (such as reinforcing beam 11), other connectors can be appropriately selected and used.

According to the video display device including the plurality of LEDs capable of independently dimming in this exemplary embodiment described above, reduction in size, thickness, and assembly cost of the video display device can be achieved.

(Third Exemplary Embodiment)

A third exemplary embodiment is hereinafter described with reference to FIGS. 11 and 12.

Video display device 1 (not shown) presented according to the third exemplary embodiment is substantially similar to video display device 1 presented in the first exemplary embodiment or the second exemplary embodiment. Discussed more specifically in the third exemplary embodiment is distribution of control signals and distribution of operation power via cable connection between light source substrates 20 described in the second exemplary embodiment. The configuration not disclosed in the first exemplary embodiment or the second exemplary embodiment is chiefly discussed hereinbelow, with appropriate omission of the matters already described in the first exemplary embodiment or the second exemplary embodiment.

[3-1. Configuration]

Figure 11:
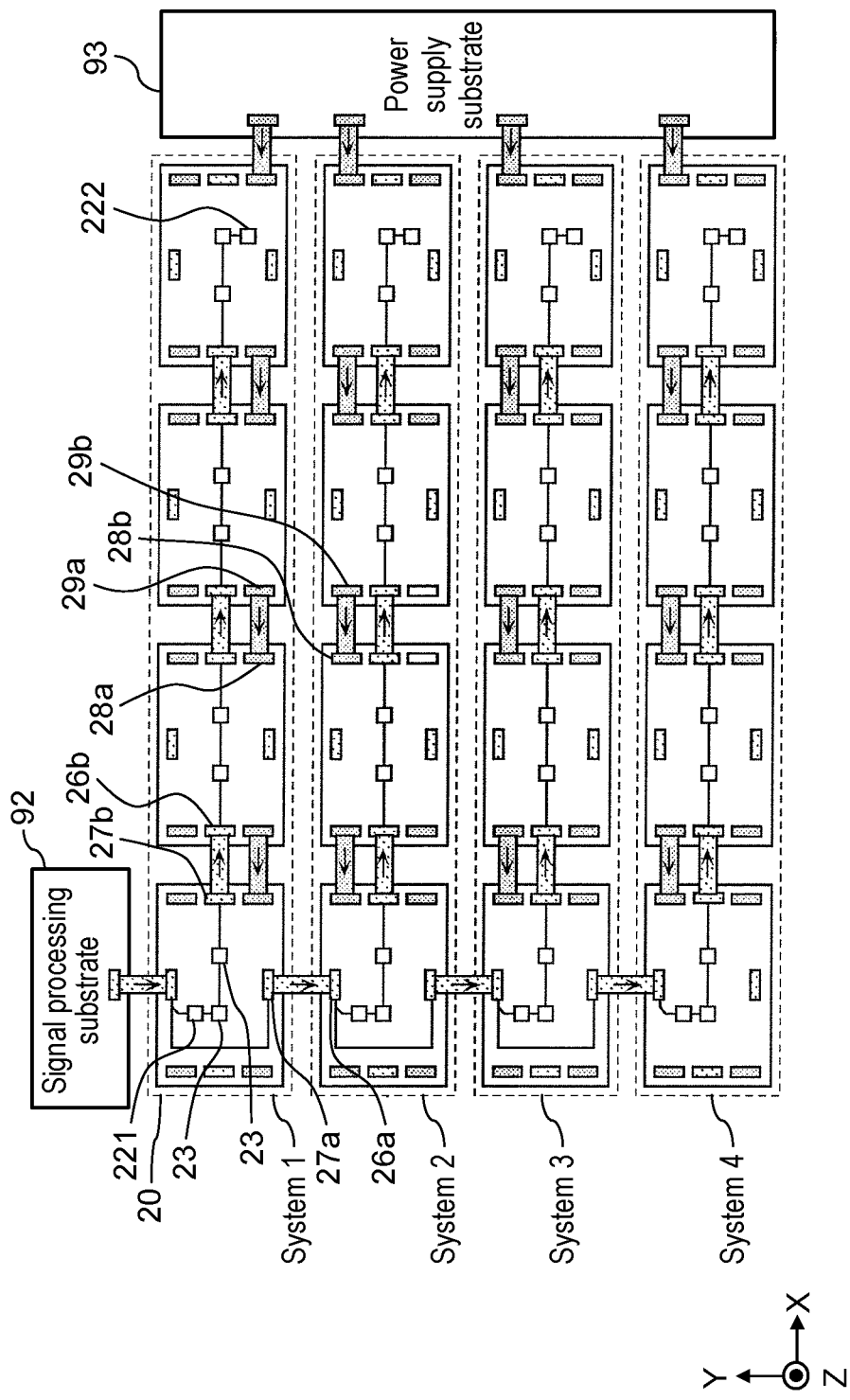
FIG. 11 is a view schematically illustrating an example of transmission paths for control signals and operation power in a video display device according to a third exemplary embodiment.

FIG. 11 is a view schematically illustrating an example of transmission paths of control signals and operation power in video display device 1 according to the third exemplary embodiment. FIG. 11 illustrates transmission paths for each of the control signals and the operation power in a state that light source substrates 20 are disposed on the front side of base plate 10 (inverted state of FIG. 10 in left-right direction). In addition, in FIG. 11, connectors and cables for distribution of control signals are shown in light gray, while connectors and cables for distribution of operation power are shown in dark gray. Note that signal processing substrate 92 and power supply substrate 93 disposed along light source substrates 20 in FIG. 11 may be located at positions overlapping with light source substrates 20 in FIG. 11 on the rear side of base plate 10.

In the following description, constituent elements substantially similar to the constituent elements included in video display device 1 according to the first exemplary embodiment or the second exemplary embodiment have been given reference numbers similar to the reference numbers of the constituent elements of the first exemplary embodiment or the second exemplary embodiment. The description of these constituent elements is omitted.

Distribution of control signals is initially described.

Each of light source substrates 20 of video display device 1 according to the third exemplary embodiment belongs to at least one of a plurality of signal systems. It is assumed in this exemplary embodiment that respective light source substrates 20 disposed in a row or a column belong to one signal system. In addition, signal processing substrate 92 includes a circuit which generates control signals for controlling (dimming) luminance of LEDs 21 of light source substrates 20 based on image signals as described in the first exemplary embodiment. It is assumed in this exemplary embodiment that this circuit is configured to generate control signals for each of the signal systems. In other words, video display device 1 according to this exemplary embodiment includes signal processing substrate 92 which generates control signals for each of the signal systems.

According to the example illustrated in FIG. 11, 16 light source substrates 20 on base plate 10 are disposed in a matrix shape (such as 4-row and 4-column) on the front surface of base plate 10 as described in the first and second exemplary embodiments. In this case, four light source substrates 20 disposed in the horizontal direction in the figure (i.e., four light source substrates 20 arranged in one row) belong to one signal system. According to the example illustrated in FIG. 11, the plurality of light source substrates 20 are divided into four rows. Accordingly, each of the plurality of light source substrates 20 belongs to any one of the four signal systems. Note that it is assumed that the signal systems in FIG. 11 are constituted by system 1, system 2, system 3, and system 4 from top to bottom in the figure. More specifically, according to the example illustrated in FIG. 11, system 1, system 2, system 3, and system 4 are disposed in a line in the vertical direction in the figure. However, this exemplary embodiment is not limited to the configuration illustrated in FIG. 11.

The plurality of light source substrates 20 belonging to an identical signal system are connected in series by cable connection provided between signal output connector 27b and signal input connector 26b of adjacent ones of light source substrates 20 (adjacent in the row direction in the example illustrated in FIG. 11). In this case, a control signal generated by signal processing substrate 92 for each of the signal systems is transmitted in series between adjacent ones of light source substrates 20 belonging to the corresponding signal system.

According to this exemplary embodiment, the control signal generated by signal processing substrate 92 is received by each of the signal systems. It is assumed that initial light source substrate 20 which initially transmits the control signal to another one of light source substrates 20 belonging to the same signal system is defined as a representative light source substrate. In other words, it is assumed that one light source substrate 20 included in the plurality of light source substrates 20 belonging to an identical signal system is defined as a representative light source substrate. Accordingly, video display device 1 of this exemplary embodiment includes the same plural number of the representative light source substrates as the number of the signal systems. Each of the representative light source substrates of the respective signal systems is disposed at an end portion of the corresponding row or column. According to the example illustrated in FIG. 11, four light source substrates 20 disposed at the left ends of the respective signal systems (i.e., ends of respective rows) correspond to representative light source substrates. Accordingly, the four representative light source substrates are arranged in the column direction in the example illustrated in FIG. 11.

The plurality of representative light source substrates are connected in series via cable connection provided between signal output connector 27a and signal input connector 26a of the adjacent ones of the representative light source substrates (adjacent in the column direction in the example illustrated in FIG. 11). In this case, a control signal generated by signal processing substrate 92 for the plurality of signal systems is transmitted in series between the adjacent ones of the representative light source substrates. Note that the connectors used for this transmission (i.e., transmission of control signal between respective light source substrates) in this exemplary embodiment are referred to as cascade input connectors or cascade output connectors. Signal input connector 26a is presented as an example of the cascade input connector, while signal output connector 27a is presented as an example of the cascade output connector. Note that signal input connector 26a is also an example of the signal input connector. More specifically, signal input connector 26a is used as the cascade input connector, and also as the signal input connector in each of the representative light source substrates. This manner of functions of signal input connector 26a is realized by such a configuration of signal input connector 26a as to through-output an input control signal to both signal output connector 27a and signal output connector 27b. Each of the representative light source substrates receives the control signal via signal input connector 26a as a signal of the signal system to which the corresponding representative light source substrate belongs, and through-outputs the received control signal to signal output connector 27b.

Buffer 221 is provided on each of the representative light source substrates to amplify the control signal. Moreover, terminator 222 is provided on light source substrate 20 at a final end of each of the signal systems (light source substrate 20 at the right end in the figure) to reduce waveform distortion of the control signal. Driver element 23 receives the control signal from a signal line path formed between buffer 221 and terminator 222. Buffer 221 is constituted by a repeater IC chip, for example. Terminator 222 is constituted by a chip resistor, for example.

Figure 12:
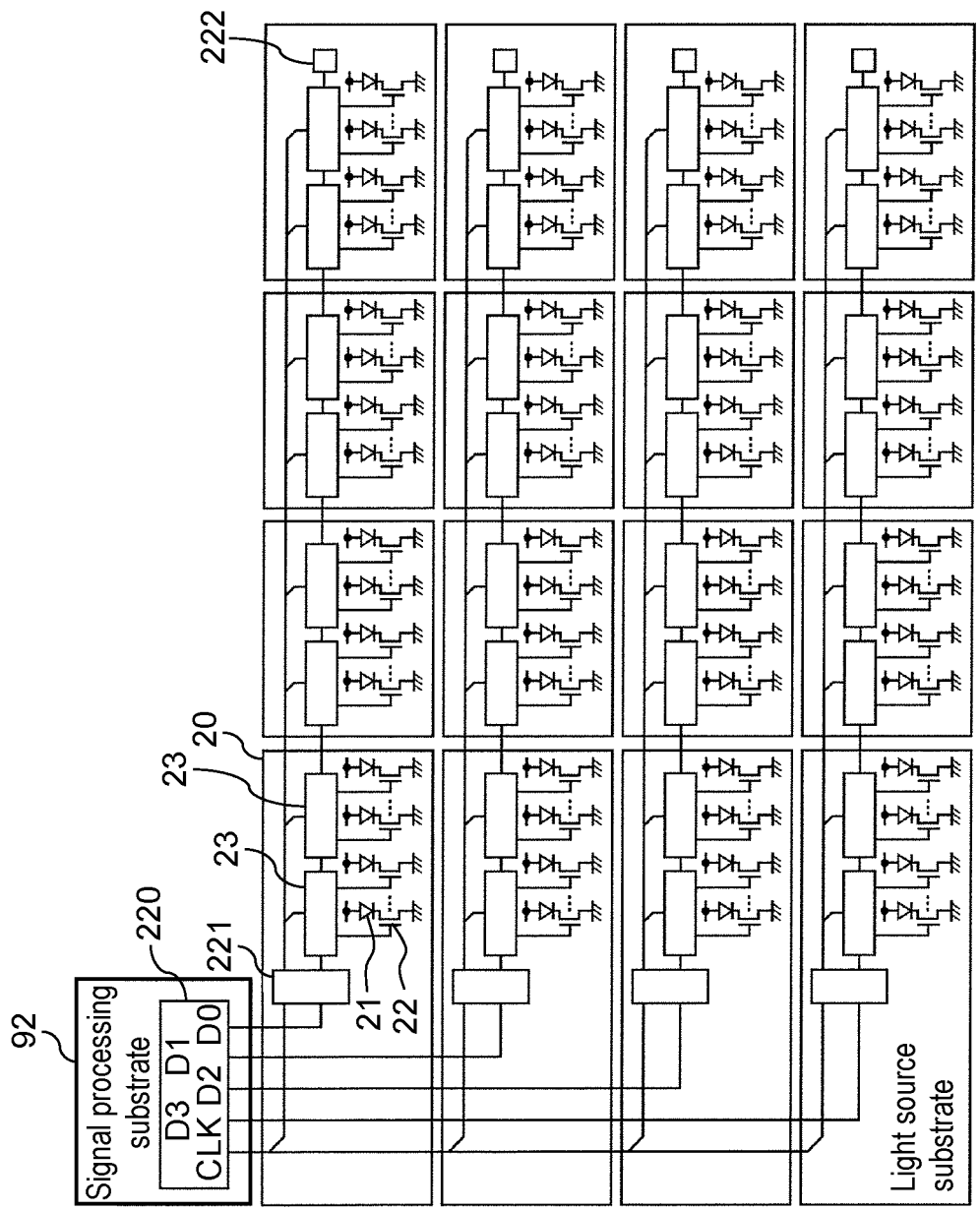
FIG. 12 is a circuit diagram schematically illustrating an example of signal transmission circuits formed by connection between substrates in the video display device according to the third exemplary embodiment.

FIG. 12 is a circuit diagram schematically illustrating an example of a signal transmission circuit constituted by connection between substrates in video display device 1 according to the third exemplary embodiment. Controller 220 is provided on signal processing substrate 92.

Controller 220 generates control signals indicating luminance of light emitted from respective LEDs 21. Each of the control signals may indicate brightness of an image for each of the areas illuminated by corresponding LED 21, or emission luminance of corresponding LED 21. Controller 220 may be an IC chip including a dedicated hardware circuit, or may be a one-chip microcontroller which generates the control signal by using a software function.

In the following description, LED 21 included in light source substrate 20 belonging to a certain signal system is also referred to as LED 21 belonging to the corresponding signal system.

A control signal generated by controller 220 for each of the signal systems includes data signal D0, data signal D1, data signal D2, data signal D3, and clock signal CLK indicating emission luminance of LED 21 belonging to the corresponding signal system. Data signal D0 is a control signal indicating emission luminance of LED 21 belonging to system 1. Data signal D1 is a control signal indicating emission luminance of LED 21 belonging to system 2. Data signal D2 is a control signal indicating emission luminance of LED 21 belonging to system 3. Data signal D3 is a control signal indicating emission luminance of LED 21 belonging to system 4. Clock signal CLK is a clock signal specifying each timing of data signals D0 through D3. Note that each of data signals D0 through D3 may be a signal serially indicating emission luminance of LED 21 within a corresponding signal system, or brightness of a corresponding area of an image in synchronization with clock signal CLK.

Each of driver elements 23 functions as a sub controller operating in cooperation with controller 220, and generates a gate signal of driver element 22 (MOS transistor) associated with corresponding driver element 23 in accordance with a control signal received from controller 220. Driver element 22 supplies current corresponding to the gate signal to LED 21, and drives LED 21 such that light is emitted therefrom with luminance corresponding to the control signal.

According to the configuration which transmits a control signal between the plurality of light source substrates connected in series, loads (the number of driver elements 23 to which one control signal is distributed) is generally limited to reduce waveform distortion of the control signal to be transmitted. Accordingly, a limit is set to the number of light emitting diodes (channel number) subjected to independent luminance control in this configuration.

For example, assuming that M is an upper limit number of driver elements to which one control signal is distributable, and that N is a channel number of one driver element, the channel number per control signal is limited to M×N per control signal.

On the other hand, according to the configuration illustrated in FIG. 12, a control signal is transmitted in series between the adjacent ones of light source substrates 20 for each of the plurality of signal systems. In this case, reduction in size, thickness, and assembly cost of the device can be achieved while increasing the channel number.

In addition, according to the configuration illustrated in FIG. 12, a control signal controlling the plurality of signal systems is supplied from signal processing substrate 92 to only one of the representative light source substrates, and transmitted in series between the adjacent ones of the representative light source substrates. The control signal controlling the respective signal systems is further transmitted in series between adjacent ones of light source substrates 20 in each of the signal systems. In this case, limitations to positioning of signal processing substrate 92 (such as the necessity of positioning signal processing substrate 92 at a substantially equal distance from all signal systems) decrease, wherefore the degree of freedom in positioning of substrates increases. Moreover, cables necessary for transmission of the control signal can be relatively short. Accordingly, the size, thickness, and assembly cost of the device can further decrease.

Furthermore, the plurality of light source substrates 20 in this exemplary embodiment are arranged in matrix such that each of the representative light source substrates is disposed at the end of the corresponding row. Accordingly, a length of cables necessary for transmission of a control signal is optimized (i.e., length of cables between light source substrates 20 is minimized). This advantageous effect can be similarly obtained even in a structure which includes a signal system for each column, and a representative light source substrate disposed at each end of the columns.

Distribution of operation power is hereinafter described with reference to FIG. 11.

According to this exemplary embodiment, each of the plurality of light source substrates 20 includes, as a plurality of connectors, a first power input connector, a second power input connector, a first power output connector, and a second power output connector which belong to an identical power supply node within corresponding light source substrate 20. Power input connector 28a is presented as an example of the first power input connector. Power input connector 28b is presented as an example of the second power input connector. Power output connector 29a is presented as an example of the first power output connector. Power output connector 29b is presented as an example of the second power output connector. More specifically, power input connector 28a, power input connector 28b, power output connector 29a, and power output connector 29b in each of light source substrates 20 belong to an identical power supply node within corresponding light source substrate 20, and are electrically connected to each other via wiring conductors within corresponding light source substrate 20. The wiring conductor between power input connector 28a and power output connector 29a, and the wiring conductor between power input connector 28b and power output connector 29b are connected equivalently and electrically in parallel with each other to constitute a power supply path to another one of light source substrates 20. Each of light source substrates 20 is operated at a power supply voltage corresponding to a voltage between a not-shown ground (ground potential or reference potential) node and the foregoing power supply node.

Accordingly, each of light source substrates 20 operates with operation power supplied either from power input connector 28a or power input connector 28b, and outputs the supplied operation power to both power output connector 29a and power output connector 29b.

Each of the plurality of light source substrates 20 belongs to any one of a plurality of power supply systems provided separately from the foregoing signal systems. In this case, each of the plurality of light source substrates 20 belonging to a first power supply system is connected in series by cable connection between the first power output connector and the first power input connector provided on the corresponding adjacent ones of light source substrates 20, and transmits operation power supplied from power supply substrate 93 in series between corresponding light source substrates 20. Each of the plurality of light source substrates 20 belonging to a second power supply system is connected in series by cable connection between the second power output connector and the second power input connector provided on the corresponding adjacent ones of light source substrates 20, and transmits operation power supplied from power supply substrate 93 in series between corresponding light source substrates 20. Note that FIG. 11 illustrates an example of the power supply systems equivalent to the foregoing signal systems. More specifically, according to the example illustrated in FIG. 11, four light source substrates 20 arranged in one row belong to one power supply system. Note that the configuration illustrated in FIG. 11 is presented only by way of example. The power supply systems and the signal systems may be different from each other.

FIG. 11 illustrates an example which includes system 1 functioning as the first power supply system, and systems 2, 3, and 4 functioning as the second power supply systems. Accordingly, the plurality of light source substrates 20 belonging to the first power supply system (system 1) are connected in series via cable connection provided between power output connector 29*a* and power input connector 28*a* on adjacent ones of light source substrates 20 to transmit operation power supplied from power supply substrate 93 in series between adjacent ones of light source substrates 20.

On the other hand, the plurality of light source substrates 20 belonging to the second power supply systems (systems 2, 3, 4) are connected in series via cable connection provided between power output connector 29*b* and power input connector 28*b* on adjacent ones of light source substrates 20 to transmit operation power supplied from power supply substrate 93 in series between adjacent ones of light source substrates 20.

[3-2. Effects and Others]

As described above, each of the plurality of light source substrates may belong to any one of a plurality of signal systems in the video display device according to this exemplary embodiment. The video display device may further include a signal processing substrate that generates the control signal for each of the signal systems. The plurality of light source substrates that belong to the same one of the signal systems may be connected in series via cable connection provided between the signal output connector and the signal input connector of adjacent ones of the light source substrates. The control signal generated by the signal processing substrate for the corresponding signal system may be transmitted in series between the light source substrates belonging to the corresponding signal system.

Note that system 1, system 2, system 3, and system 4 are presented as an example of the plurality of signal systems. Signal processing substrate 92 is presented as an example of the signal processing substrate.

Each of the plurality of light source substrates of the video display device may further include a cascade input connector that receives the control signal, and a cascade output connector that through-outputs the control signal. A plurality of the light source substrates functioning as representative light source substrates may be provided such that each of the light source substrates functioning as the representative light source substrates is associated with the corresponding one of the signal systems. The plurality of representative light source substrates may be connected in series via cable connection provided between the cascade output connector and the cascade input connector of adjacent ones of the representative light source substrates, and allow the control signal generated by the signal processing substrate for the plurality of the signal systems to be transmitted in series between the corresponding representative light source substrates. Each of the plurality of representative light source substrates may output, to the signal output connector, the control signal of the signal system to which the corresponding representative light source substrate belongs.

Note that signal input connector 26*a* is presented as an example of the cascade input connector. Signal output connector 27*a* is presented as an example of the cascade output connector. Four light source substrates 20 disposed at the left end in FIG. 11 are presented as an example of the representative light source substrates. Data signal D0, data signal D1, data signal D2, and data signal D3 are presented as an example of the control signal of the plurality of signal systems. Signal output connector 27*b* is presented as an example of the signal output connector which outputs the control signal of the signal system to which the representative light source substrate belongs.

The plurality of light source substrates of the video display device may be disposed in matrix. In this case, the light source substrates disposed in a row or a column may belong to one of the signal systems. In addition, each of the representative light source substrates of the plurality of signal systems may be disposed at an end of the row or the column.

Note that the positions of light source substrates 20 illustrated in FIG. 11, settings of the signal systems, and the representative light source substrates are presented as an example of this configuration.

Each of the plurality of light source substrates of the video display device may include, as the plurality of connectors, a first power input connector, a second power input connector, a first power output connector, and a second power output connector that belong to an identical power supply node within the corresponding light source substrate. Each of the plurality of light source substrates may belong to any one of a plurality of power supply systems. The video display device may further include a power supply substrate that supplies operation power to the plurality of light source substrates. The plurality of light source substrates that belong to a first power supply system may be connected in series via cable connection provided between the first power output connector and the first power input connector of the adjacent ones of the light source substrates, and allow the operation power supplied from the power supply substrate to be transmitted in series between the corresponding light source substrates. The plurality of light source substrates that belong to a second power supply system may be connected in series via cable connection provided between the second power output connector and the second power input connector of the adjacent ones of the light source substrates, and allow the operation power supplied from the power supply substrate to be transmitted in series between the corresponding light source substrates.

Note that power input connector 28*a* is presented as an example of the first power input connector. Power input connector 28*b* is presented as an example of the second power input connector. Power output connector 29*a* is presented as an example of the first power output connector. Power output connector 29*b* is presented as an example of the second power output connector. The first power supply system and the second power supply system are presented as an example of the plurality of power supply systems. Power supply substrate 93 is presented as an example of the power supply substrate. Respective light source substrates 20 of system 1 are presented as an example of the plurality of light source substrates belonging to the first power supply system. Respective light source substrates 20 of systems 2 through 4 are presented as an example of the plurality of light source substrates belonging to the second power supply system.

According to video display device 1 having the foregoing configuration, operation power is transmitted in series between the adjacent ones of the light source substrates 20 for each power supply system. In this case, reduction of cables necessary for connection, and therefore reduction in size, thickness, and assembly cost of the device can be achieved. In addition, this configuration allows selection and use of appropriate connectors not interfering with other members for each power supply system at the time of connection of light source substrates 20 in series. In this case, a plurality of light source substrates 20 having the same configuration can be used for the plurality of power supply systems even when appropriate connectors are different for each of attachment positions of the plurality of light source substrates 20 to base plate 10. Accordingly, cost reduction can be achieved by using common substrates.

(Other Exemplary Embodiments)

The first through third exemplary embodiments have been described by way of example of the technology disclosed according to the present application. The accompanying drawings and detailed description have been presented for this purpose.

Accordingly, for presentation of examples of the technology, constituent elements shown in the accompanying drawings and detailed description may contain not only constituent elements essential for solving problems, but also constituent elements not essential for solving problems. It should not be therefore directly determined that the constituent elements which are not essential elements are essential based on the consideration that these constituent elements are included in the accompanying drawings and detailed description.

Moreover, the exemplary embodiments described above are presented as examples of the technology of the present disclosure, wherefore various modifications, replacements, additions, omissions and the like may be made within the scope of the claims and an equivalent range. In addition, a different exemplary embodiment may be produced by combining respective constituent elements described in the first through third exemplary embodiments.

Note that errors and variations in positions, shapes and the like of respective members included in the foregoing description are allowed as long as intended advantageous effects are offered.

INDUSTRIAL APPLICABILITY

The present disclosure is applicable to a video display device. More specifically, the present disclosure is applicable to a television receiver, an image recording and reproducing device, a computer display device, and others.

REFERENCE MARKS IN THE DRAWINGS

1: video display device
1a: housing
10: base plate
11, 12: reinforcing beam
13, 13a: opening
14, 15: cable
20, 20a, 20b, 20c, 20d, 20e, 20f, 20g: light source substrate
21: LED
22, 23: driver element
24: opening
25: screw hole
26a, 26b: signal input connector
27a, 27b: signal output connector
28a, 28b: power input connector
29a, 29b: power output connector
30: reflection sheet
31: protrusion
32, 33: opening
35: adhesive tape
36: support pin
40: flatter
41, 41a: hole
50: optical sheet
60: mold frame
70: liquid crystal display panel
71: area
80: bezel
91: connection terminal substrate
92: signal processing substrate
93: power supply substrate
220: controller
221: buffer
222: terminator

The invention claimed is:

1. A video display device comprising:
a liquid crystal display panel; and
a plurality of light source substrates configured to illuminate the liquid crystal display panel from a rear side of the liquid crystal display panel, wherein:
each of the plurality of light source substrates is disposed along the liquid crystal display panel and in a direction of row and in a direction of column,
each of the plurality of light source substrates includes:
a signal input connector that receives a control signal,
a plurality of light emitting diodes each of which is provided in correspondence with a corresponding one of areas different from each other in the liquid crystal display panel,
a driver that drives each of the plurality of light emitting diodes in accordance with the control signal such that each of the plurality of light emitting diodes emits light with luminance corresponding to brightness of the corresponding area of an image, and
a signal output connector that through-outputs the control signal, and
the signal output connector of a first light source substrate included in the plurality of light source substrates and the signal input connector of a second light source substrate included in the plurality of light source substrates are electrically connected.

2. The video display device according to claim 1, further comprising a plurality of signal systems, wherein:
each of the plurality of light source substrates belongs to any one of the plurality of signal systems,
the video display device further comprises a signal processing substrate that generates the control signal for each of the plurality of signal systems, and
a group of the plurality of light source substrates that belong to the same one of the plurality of signal systems are connected in series via cable connection provided between the signal output connector and the signal input connector of adjacent light source substrates in the group, and allow the control signal generated by the signal processing substrate for the corresponding signal system to be transmitted in series between the corresponding light source substrates.

3. The video display device according to claim 2, wherein:
each of the plurality of light source substrates further includes
a cascade input connector that receives the control signal, and
a cascade output connector that through-outputs the control signal,
a group of the plurality of the light source substrates functioning as representative light source substrates are provided such that each of the group of the plurality of light source substrates functioning as the representative light source substrates is associated with the corresponding one of the signal systems,
the representative light source substrates are connected in series via cable connection provided between the cascade output connector and the cascade input connector of adjacent ones of the representative light source substrates, and allow the control signal generated by the signal processing substrate for the plurality of signal systems to be transmitted in series between the corresponding representative light source substrates, and each of the representative light source substrates outputs, to the signal output connector, the control signal of the signal system to which the corresponding representative light source substrate belongs.

4. The video display device according to claim 3, wherein the plurality of light source substrates are disposed in matrix, light source substrates disposed in a row or a column among the plurality of light source substrates belong to one of the plurality of signal systems, and each of the representative light source substrates of the plurality of signal systems is disposed at an end of the row or the column.

5. The video display device according to claim 1, wherein each of the plurality of light source substrates includes a plurality of connectors that belong to an identical circuit node within a corresponding light source substrate such that the plurality of connectors are respectively disposed at different positions.

6. The video display device according to claim 5, further comprising a plurality of power supply systems, wherein:

each of the plurality of light source substrates includes, as the plurality of connectors, a first power input connector, a second power input connector, a first power output connector, and a second power output connector that belong to an identical power supply node within the corresponding light source substrate, each of the plurality of light source substrates belongs to any one of the plurality of power supply systems, the video display device further comprises a power supply substrate that supplies operation power to the plurality of light source substrates, a first group of the plurality of light source substrates that belong to a first power supply system are connected in series via cable connection provided between the first power output connector and the first power input connector of adjacent ones of the light source substrates, and allow the operation power supplied from the power supply substrate to be transmitted in series between corresponding light source substrates, and a second group of the plurality of light source substrates that belong to a second power supply system are connected in series via cable connection provided between the second power output connector and the second power input connector of adjacent ones of the light source substrates, and allow the operation power supplied from the power supply substrate to be transmitted in series between corresponding light source substrates.

7. The video display device according to claim 1, wherein the light emitting diodes and the driver are provided on an identical surface of each of the plurality of light source substrates.

8. The video display device according to claim 2, wherein:

one of the plurality of light source substrates is electrically connected to the signal processing substrate, and the control signal supplied from the signal processing substrate is input to the one of the plurality of light source substrates, and the signal input to the one light source substrate is distributed to other light source substrates.

9. The video display device according to claim 1, wherein the plurality of light source substrates are physically separated elements from each other.

10. The video display device according to claim 1, wherein the driver is disposed at the vicinity of the each of the plurality of light emitting diodes.

* * * * *